(12) United States Patent
Kim et al.

(10) Patent No.: US 9,706,300 B2
(45) Date of Patent: Jul. 11, 2017

(54) COLLABORATIVE AUDIO PROCESSING

(71) Applicant: QUALCOMM Incorporated, San Diego, CA (US)

(72) Inventors: Lae-Hoon Kim, San Diego, CA (US);
Erik Visser, San Diego, CA (US);
Raghuveer Peri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/859,128

(22) Filed: Sep. 18, 2015

(65) Prior Publication Data

US 2017/0085985 A1    Mar. 23, 2017

(51) Int. Cl.
| | | |
|---|---|---|
| *H04B 5/00* | (2006.01) | |
| *H04R 3/00* | (2006.01) | |
| *H04S 7/00* | (2006.01) | |
| *G06F 3/16* | (2006.01) | |
| *G10L 21/0216* | (2013.01) | |

(Continued)

(52) U.S. Cl.
CPC ............. *H04R 3/005* (2013.01); *G06F 3/16* (2013.01); *G10L 21/0216* (2013.01); *H04S 7/40* (2013.01); *G10L 2021/02166* (2013.01); *H04R 2420/07* (2013.01); *H04R 2499/11* (2013.01); *H04R 2499/15* (2013.01); *H04S 7/00* (2013.01); *H04S 2400/15* (2013.01); *H04W 4/023* (2013.01); *H04W 84/18* (2013.01)

(58) Field of Classification Search
CPC .... H04R 27/00; H04R 3/005; H04R 2420/07; H04R 2499/11; H04R 2227/005; H04R 2410/01; H04R 2460/07; H04R 2499/15; H04R 25/356; H04R 25/60; H04R 29/001; H04R 29/004; H04R 3/002; H04R 3/12; H04R 5/02; H04R 2410/05; G06F 3/167; G06F 17/30017
USPC ......... 381/77, 82, 119, 98, 1, 106, 107, 108, 381/123, 56, 57, 71.1, 71.11, 71.12, 381/71.14, 79, 80, 85, 61, 74

See application file for complete search history.

(56) References Cited

U.S. PATENT DOCUMENTS 6,674,451 B1 *   1/2004   Fado ......................... G06F 3/16
                                                                    381/93
9,408,011 B2    8/2016   Kim et al.
(Continued)

FOREIGN PATENT DOCUMENTS

WO        2006066618 A1    6/2006
WO        2014096900 A1    6/2014

OTHER PUBLICATIONS

International Search Report and Written Opinion—PCT/US2016/044563—ISA/EPO—Oct. 20, 2016.

*Primary Examiner* — Akelaw Teshale

(57) ABSTRACT

A method of generating audio output includes displaying a graphical user interface (GUI) at a user device. The GUI represents an area having multiple regions and multiple audio capture devices are located in the area. The method also includes receiving audio data from the multiple audio capture devices. The method further includes receiving an input indicating a selected region of the multiple regions. The method also includes generating, at the user device, audio output based on audio data from a subset of the multiple audio capture devices. Each audio capture device in the subset is located in the selected region.

30 Claims, 10 Drawing Sheets

(51) Int. Cl.
*H04W 4/02* (2009.01)
*H04W 84/18* (2009.01)

(56) References Cited

U.S. PATENT DOCUMENTS

| | | | | |
|---|---|---|---|---|
| 2002/0049979 | A1* | 4/2002 | White | G11B 27/034 |
| | | | | 725/87 |
| 2004/0199395 | A1* | 10/2004 | Schulz | G11B 27/031 |
| | | | | 704/278 |
| 2009/0190769 | A1 | 7/2009 | Wang et al. | |
| 2009/0238377 | A1 | 9/2009 | Ramakrishnan et al. | |
| 2010/0119072 | A1* | 5/2010 | Ojanpera | G10L 19/008 |
| | | | | 381/17 |
| 2011/0301730 | A1* | 12/2011 | Kemp | G10L 19/008 |
| | | | | 700/94 |
| 2013/0222230 | A1* | 8/2013 | Choi | G06F 3/167 |
| | | | | 345/156 |
| 2013/0262101 | A1 | 10/2013 | Srinivasan | |
| 2013/0332157 | A1 | 12/2013 | Iyengar et al. | |
| 2014/0018097 | A1* | 1/2014 | Goldstein | G06F 19/3406 |
| | | | | 455/456.1 |
| 2014/0086423 | A1 | 3/2014 | Domingo Yaguez et al. | |
| 2014/0136203 | A1* | 5/2014 | Liu | H04R 3/005 |
| | | | | 704/246 |
| 2015/0051906 | A1 | 2/2015 | Dickins et al. | |
| 2015/0055797 | A1 | 2/2015 | Nguyen et al. | |
| 2015/0063597 | A1 | 3/2015 | Daly | |
| 2015/0081295 | A1 | 3/2015 | Yun et al. | |
| 2015/0135234 | A1 | 5/2015 | Hall | |
| 2015/0146874 | A1 | 5/2015 | Ojanpera | |
| 2016/0004499 | A1* | 1/2016 | Kim | G06F 3/04847 |
| | | | | 715/716 |
| 2017/0084286 | A1 | 3/2017 | Kim et al. | |

\* cited by examiner

COLLABORATIVE AUDIO PROCESSING

I. FIELD

The present disclosure is generally related to audio processing.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Some electronic devices (e.g., wireless telephones) may have multiple microphones. If a target sound, such as speech of a user, is detected by a first microphone, a signal captured by another microphone may be used to perform noise suppression on a signal captured by the first microphone. Because acoustic geometry between multiple microphones on a single device is fixed, the signal of the other microphone may be used for noise suppression. Audio signals from other devices may also be used; however, conventional multi-microphone processing algorithms require access to geometric information, such as a distance between microphones or a location of one microphone relative to the other.

III. SUMMARY

According to one example of the techniques disclosed herein, a method of performing noise reduction includes capturing a first audio signal at a first microphone of a first device. The method also includes receiving, at the first device, audio data representative of a second audio signal from a second device. The second audio signal is captured by a second microphone of the second device. The method further includes performing noise reduction on the first audio signal based at least in part on the audio data representative of the second audio signal.

According to another example of the techniques disclosed herein, a first device includes a first microphone configured to capture a first audio signal. The first device also includes a receiver configured to receive audio data representative of a second audio signal from a second device. The second audio signal is captured by a second microphone of the second device. The first device further includes a processor configured to perform noise reduction on the first audio signal based at least in part on the audio data representative of the second audio signal.

According to another example of the techniques disclosed herein, a non-transitory computer-readable medium includes instructions for performing noise reduction. The instructions, when executed by a processor of a first device, cause the processor to perform operations including receiving a first audio signal captured at a first microphone of the first device. The operations also comprise receiving audio data representative of a second audio signal from a second device. The second audio signal is captured by a second microphone of the second device. The operations further include performing noise reduction on the first audio signal based at least in part on the audio data representative of the second audio signal.

According to another example of the techniques disclosed herein, a first device comprises means for capturing a first audio signal. The first device also includes means for receiving audio data representative of a second audio signal from a second device. The second audio signal is captured by a microphone of the second device. The first device also includes means for performing noise reduction on the first audio signal based at least in part on the audio data representative of the second audio signal.

According to another example of the techniques disclosed herein, a method of operating a device includes receiving audio data at a first user device from a second user device. The audio data is based on an audio signal captured at a microphone of the second user device. The method also includes performing a speaker verification function based on the audio data to determine a likelihood value indicating a likelihood that a voice represented by the audio data matches a particular voice. The method further includes enabling one or more functions of the first user device in response to the likelihood value exceeding a threshold.

According to another example of the techniques disclosed herein, an apparatus includes a processor and a memory storing instructions that are executable by the processor to perform operations. The operations include receiving audio data at a first user device from a second user device. The audio data is based on an audio signal captured at a microphone of the second user device. The operations also include performing a speaker verification function based on the audio data to determine a likelihood value indicating a likelihood that a voice represented by the audio data matches a particular voice. The operations further include enabling one or more functions of the first user device in response to the likelihood value exceeding a threshold.

According to another example of the techniques disclosed herein, a non-transitory computer-readable medium includes instructions for operating a device. The instructions, when executed by a processor, cause the processor to perform operations including receiving audio data at a first user device from a second user device. The audio data is based on an audio signal captured at a microphone of the second user device. The operations also include performing a speaker verification function based on the audio data to determine a likelihood value indicating a likelihood that a voice represented by the audio data matches a particular voice. The operations further include enabling one or more functions of the first user device in response to the likelihood value exceeding a threshold.

According to another example of the techniques disclosed herein, an apparatus includes means for receiving audio data at a first user device from a second user device. The audio data is based on an audio signal captured at a microphone of the second user device. The apparatus also includes means for performing a speaker verification function based on the audio data to determine a likelihood value indicating a likelihood that a voice represented by the audio data matches a particular voice. The apparatus further includes means for enabling one or more functions of the first user device in response to the likelihood value exceeding a threshold.

According to another example of the techniques disclosed herein, a method of generating audio output includes displaying a graphical user interface (GUI) at a user device. The GUI represents an area having multiple regions and multiple audio capture devices are located in the area. The method also includes receiving audio data from at least one of the multiple audio capture devices. The method further includes receiving an input indicating a selected region of the multiple regions. The method also includes generating, at the user device, audio output based on audio data from a subset of the multiple audio capture devices. Each audio capture device in the subset is located in the selected region.

According to another example of the techniques disclosed herein, an apparatus includes a processor and a memory storing instructions that are executable by the processor to perform operations. The operations include displaying a graphical user interface (GUI) at a user device. The GUI represents an area having multiple regions and multiple audio capture devices are located in the area. The operations also include receiving audio data from at least one of the multiple audio capture devices. The operations further include receiving an input indicating a selected region of the multiple regions. The operations also include generating, at the user device, audio output based on audio data from a subset of the multiple audio capture devices. Each audio capture device in the subset is located in the selected region.

According to another example of the techniques disclosed herein, a non-transitory computer-readable medium includes instructions that, when executed by a processor, cause the processor to perform operations including displaying a graphical user interface (GUI) at a user device. The GUI represents an area having multiple regions and multiple audio capture devices are located in the area. The operations also include receiving audio data from at least one of the multiple audio capture devices. The operations further include receiving an input indicating a selected region of the multiple regions. The operations also include generating audio, at the user device, output based on audio data from a subset of the multiple audio capture devices. Each audio capture device in the subset is located in the selected region.

According to another example of the techniques disclosed herein, an apparatus includes means for displaying a graphical user interface (GUI) at a user device. The GUI represents an area having multiple regions and multiple audio capture devices are located in the area. The apparatus also includes means for receiving audio data from at least one of the multiple audio capture devices. The apparatus further includes means for receiving an input indicating a selected region of the multiple regions. The apparatus also includes means for generating audio output at the user device based on audio data from a subset of the multiple audio capture devices. Each audio capture device in the subset is located in the selected region.

IV. BRIEF DESCRIPTION OF THE DRAWINGS

V. DETAILED DESCRIPTION

Particular implementations of the present disclosure are described with reference to the drawings. In the description, common features are designated by common reference numbers throughout the drawings.

Figure 1:
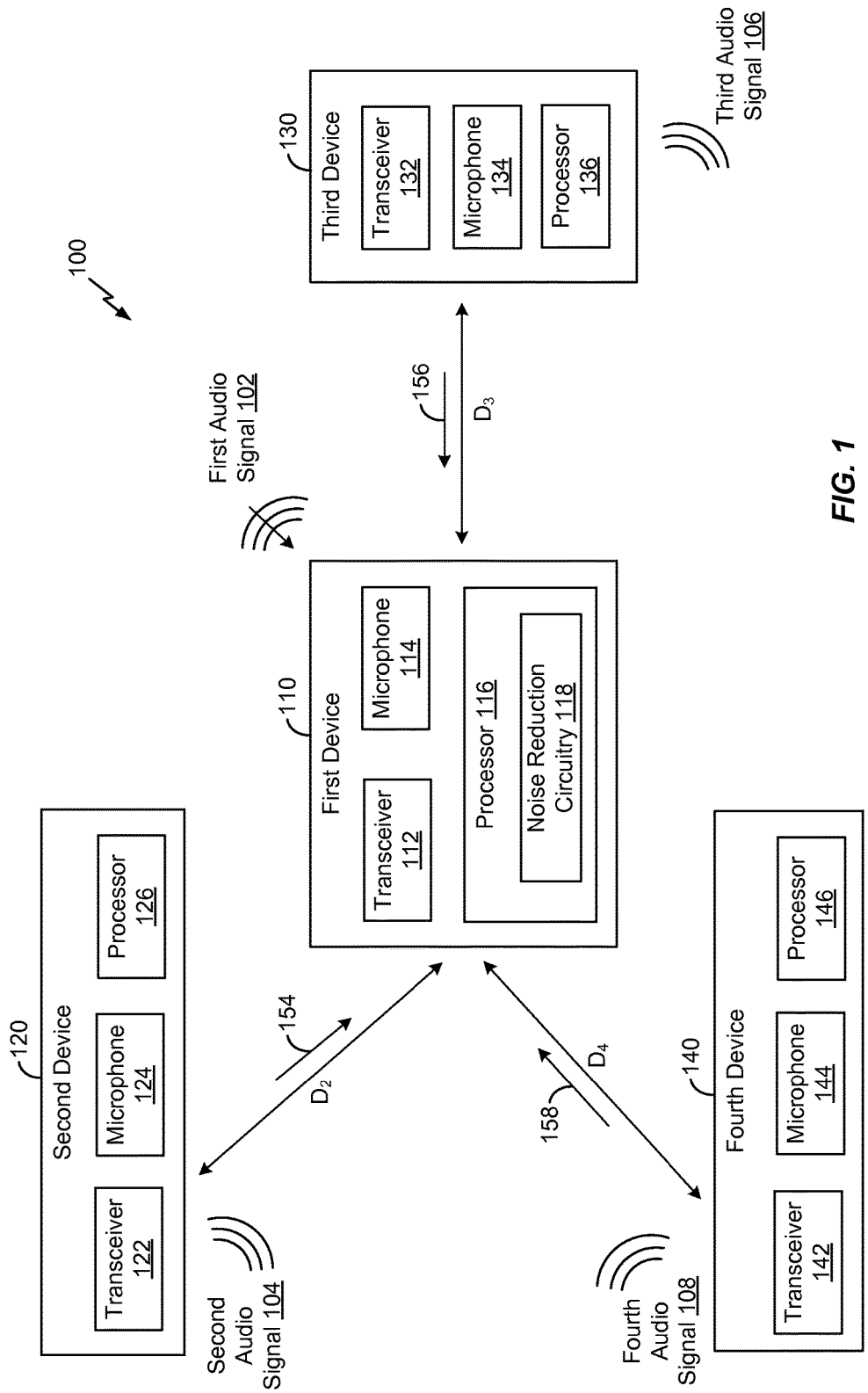
FIG. 1 is a system that is operable to suppress noise using audio signals captured from multiple devices.

Referring to FIG. 1, a system 100 that is operable to suppress noise using audio signals captured from multiple devices is shown. The system 100 includes a first device 110, a second device 120, a third device 130, and a fourth device 140. Each device 110, 120, 130, 140 may be an electronic device that is operable to capture surrounding audio sounds via a microphone. Although four devices 110, 120, 130, 140 are depicted in the system 100, in other implementations, the noise suppression techniques described herein may be implemented using additional (or fewer) devices. As non-limiting examples, the noise suppression techniques described herein may be implemented using ten devices or two devices.

According to one implementation, one or more of the devices 110, 120, 130, 140 may be a wireless communications device (e.g., a mobile phone). However, in other implementations, one or more of the devices 110, 120, 130, 140 may be other electronic devices operable to capture audio signals and operable to transmit the captured audio signals. As non-limiting examples, one or more of the devices 110, 120, 130, 140 may be a tablet, a personal digital assistant (PDA), a laptop computer, a computer, a display device, a gaming console, a music player, a radio, a digital video player, a digital video disc (DVD) player, a tuner, a camera, a navigation device, a set-top box, a television, a laundry machine, etc.

The first device 110 includes a transceiver 112, a microphone 114, and a processor 116. According to one implementation, in lieu of the transceiver 112, the first device 110 may include a receiver and a transmitter. The second device 120 includes a transceiver 122, a microphone 124, and a processor 126. According to one implementation, in lieu of the transceiver 122, the second device 120 may include a receiver and a transmitter. The third device 130 includes a transceiver 132, a microphone 134, and a processor 136. According to one implementation, in lieu of the transceiver 132, the third device 130 may include a receiver and a transmitter. The fourth device 140 includes a transceiver 142, a microphone 144, and a processor 146. According to one implementation, in lieu of the transceiver 142, the fourth device 140 may include a receiver and a transmitter.

The microphones 114, 124, 134, 144 of each device 110, 120, 130, 140 may be configured to capture surrounding audio signals. For example, the microphone 114 may be configured to capture a first audio signal 102, the microphone 124 may be configured to capture a second audio signal 104, the microphone 134 may be configured to capture a third audio signal 106, and the microphone 144 may be configured to capture a fourth audio signal 108. The first audio signal 102 may include a "primary" component (e.g., a speech (S) component or a target component) and secondary components (e.g., noise components). The secondary components of the first audio signal 102 may originate from (or may be generated from) the other audio signals 104, 106, 108. As a non-limiting example, a first audio level ($A_1$) (or energy level) of the first audio signal 102 may be expressed as $$A_1 = S + \frac{N_2}{D_2} + \frac{N_3}{D_3} + \frac{N_4}{D_4},$$

wherein S is a speech component (or the "target" component), $N_2$ is a noise component associated with the second audio signal 104, $N_3$ is a noise component associated with the third audio signal 106, $N_4$ is a noise component associated with the fourth audio signal 108, $D_2$ is the distance between the first and second devices 110, 120, $D_3$ is the distance between the first and third devices 110, 130, and $D_4$ is the distance between the first and fourth devices 110, 140.

The speech component (S) and each noise component ($N_2$, $N_3$, $N_4$) may have a different frequency. For example, the speech component (S) may have a frequency ($f_1$), the noise component ($N_2$) may have a frequency ($f_2$), the noise component ($N_3$) may have a frequency ($f_3$), and the noise component ($N_4$) may have a frequency ($f_4$). As described below, the frequencies of each noise component may be used by the processor 116 during a max-pooling operation to generate a non-target reference signal used to perform noise reduction on the first audio signal 102 at the first device 110. The noise component ($N_2$) may be generated by the second device 120 or generated within a relatively close proximity of the second device 120. The noise component ($N_3$) may be generated by the third device 130 or generated within a relatively close proximity of the third device 130. The noise component ($N_4$) may be generated by the fourth device 140 or generated within a relatively close proximity of the fourth device 140. However, one or more of the noise components ($N_2$-$N_4$) may also be captured by the microphone 114 of the first device 110. Because the noise components ($N_2$-$N_4$) are captured at the microphone 114, the first audio level ($A_1$) may be at least partially based on the noise components ($N_2$-$N_4$), as indicated in the equation above.

A second audio level ($A_2$) of the second audio signal 104 may be expressed as $$A_2 = N_2 + \frac{S}{D_2}.$$

A third audio level ($A_3$) of the third audio signal 106 may be expressed as $$A_3 = N_3 + \frac{S}{D_3}.$$

A fourth audio level ($A_4$) of the fourth audio signal 108 may be expressed as $$A_4 = N_4 + \frac{S}{D_4}.$$

It should be understood that the expressions (e.g., mathematical formulas) for the audio levels of the audio signals 102, 104, 106, 108 are merely examples and should not be construed as limiting. For example, the audio levels ($A_1$-$A_4$) need not be expressed based on the above equations, but is should be understood that the farther away a source of noise is to the microphone, the smaller the audio level of the noise at the microphone.

The first device 110 may be configured to perform a noise reduction operation on the first audio signal 102 to enhance the primary component (e.g., the speech (S)) of the first audio signal 102. Prior to performing the noise reduction operation, the other devices 120, 130, 140 may transmit audio data 154, 156, 158 that is representative of the corresponding audio signals 104, 106, 108, respectively, to the first device 110. For example, after capturing the second audio signal 104 with the microphone 124, the second device 120 may transmit second audio data 154 representative of the second audio signal 104 to the first device 110 using the transceiver 122. After capturing the third audio signal 106 with the microphone 134, the third device 130 may transmit third audio data 156 representative of the third audio signal 106 to the first device 110 using the transceiver 132. After capturing the fourth audio signal 108 with the microphone 144, the fourth device 140 may transmit fourth audio data 158 representative of the fourth audio signal 108 to the first device 110 using the transceiver 142.

The audio data 154, 156, 158 may have substantially similar properties of the corresponding audio signal 104, 106, 108, respectively. As a non-limiting example, the audio data 154, 156, 158 may include a copy of the captured audio signals 104, 106, 108, respectively. Thus, for ease of description and illustration, the second audio data 154 may be used interchangeably with the second audio signal 104, the third audio data 156 may be used interchangeably with the third audio signal 106, and the fourth audio data 156 may be used interchangeably with the fourth audio signal 108. However, it should be understood that each transceiver 122, 132, 142 transmits a duplicate copy or representation of the captured audio signal 104, 106, 108, respectively.

After receiving the audio signals 104, 106, 108 from the corresponding transceivers 122, 132, 142, noise reduction circuitry 118 of the processor 116 may perform a gain pre-conditioning operation on the audio signals 104, 106, 108. The gain pre-conditioning operation may normalize the level of each audio signal 104, 106, 108. To perform the gain pre-conditioning operation, the noise reduction circuitry 118 may track the power (level) difference between the first audio signal 102 (e.g., the "main input" signal) and the other audio signals 104, 106, 108 (e.g., the "sub-input" signals) and may recursively update gain conditioning factors applied to each audio signal 104, 106, 108 to normalize the level of each audio signal 104, 106, 108. As used herein, a "sub-input" signal includes any audio signal captured at a microphone that is background noise with respect to main signal captured at the microphone.

To illustrate, the noise reduction circuitry 118 may apply a gain conditioning factor ($G_2$) to the second audio signal 104 provided by the second device 120 to generate a second gain-adjusted audio signal (not shown), may apply a gain conditioning factor ($G_3$) to the third audio signal 106 provided by the third device 130 to generate a third gain-adjusted audio signal (not shown), and may apply a gain conditioning factor ($G_4$) to the fourth audio signal 108 provided by the fourth device 140 to generate a fourth gain-adjusted audio signal (not shown). As used herein, applying a gain factor may include increasing (or decreasing) an audio level of a corresponding signal. The gain conditioning factor ($G_2$) applied to the second audio signal 104 may be a value such that an audio level of the second gain-adjusted audio signal is less than the speech (S) level of the first audio signal 102 and such that the audio level of the second gain-adjusted audio signal is greater than the secondary component $$\left(\frac{N_2}{D_2}\right)$$

of the first audio signal 102. The gain conditioning factor (G$_3$) applied to the third audio signal 106 may be a value such that an audio level of the third gain-adjusted audio signal is less than the speech (S) level of the first audio signal 102 and such that the audio level of the third gain-adjusted audio signal is greater than the secondary component $$\left(\frac{N_3}{D_3}\right)$$

of the first audio signal 102. The gain conditioning factor (G$_4$) applied to the fourth audio signal 108 may be a value such that an audio level of the fourth gain-adjusted audio signal is less than the speech (S) level of the first audio signal 102 and such that the audio level of the fourth gain-adjusted audio signal is greater than the secondary component $$\left(\frac{N_4}{D_4}\right)$$

of the first audio signal 102.

To perform the gain pre-conditioning operation, the noise reduction circuitry 118 may use minimum statistics tracking to reduce energy normalization among channels such that each audio signal 102, 104, 106, 108 has a substantially similar audio level for ambient stationary noise. For example, when the main power (e.g., the first audio level (A$_1$) of the first audio signal 102) is significantly higher than the sub-power (e.g., the audio levels of the other signals 104, 106, 108), the noise reduction circuitry 118 may provide a gain-adjusted sub-power less than the main power (including some margin) to reduce overestimation of noise. When the sub-power is significantly higher than the main power, the noise reduction circuitry 118 may provide a gain-adjusted sub-power higher than the main power (including some margin) to ensure overestimation of noise.

After the gain conditioning factors have been applied to the audio signals 104, 106, 108 by the noise reduction circuitry 118 to generate the gain-adjusted audio signals, the noise reduction circuitry 118 may perform a max-pooling operation on the gain-adjusted audio signals to generate a non-target reference signal (not shown). As described in greater detail with respect to FIG. 2, the max-pooling operation may select (e.g., "pool") different noise components from the gain-adjusted audio signals to generate the non-target reference signal. For example, the max-pooling operation may select a noise component at each frequency that has the maximum gain and may combine the selected noise components to generate the non-target reference signal. The noise reduction circuitry 118 may be configured to perform noise reduction on the first audio signal 102 using the non-target reference signal. For example, the noise reduction circuitry 118 may "reduce" the noise components $$\left(\frac{N_2}{D_2} + \frac{N_3}{D_3} + \frac{N_4}{D_4}\right)$$

of the first audio signal 102 by combining the non-target reference signal with the first audio signal 102. As a result combining the non-target reference signal with first audio signal 102, the noise reduction circuitry 118 may enhance the speech (S) component of the first audio signal 102 by reducing noise in the first audio signal 102.

The system 100 of FIG. 1 may enable the first device 110 to reduce noise components of the first audio signal 102 using audio signals 104, 106, 108 captured by microphones 124, 134, 144 of other devices 120, 130, 140. For example, non-target source suppression (e.g., noise suppression) may be used by the noise reduction circuitry 118 to aggregate the responses of the microphones 124, 134, 144 as the non-target reference signal that is used to enhance target audio (e.g., the speech (S) component of the first audio signal 102) captured by the microphone 114. The techniques described with respect to FIG. 1 may enable generation of the non-target reference signal without using geometry information, such as distances between the microphones 114, 124, 134, 144. For example, the gain pre-conditioning operation may enable the noise suppression circuitry 118 to normalize the noise from each microphone 114, 124, 134, 144 by adjusting the gain of the audio signals 104, 106, 108. The max-pooling operation may enable the noise suppression circuitry 118 to pool noise components from the normalized noise that reduce the noise of the first audio signal 102. For example, the max-pooling operation may generate a signal to substantially cancel noise from the first audio signal 102 by pooling a noise component at each frequency having the highest gain (e.g., highest energy level).

Figure 2:
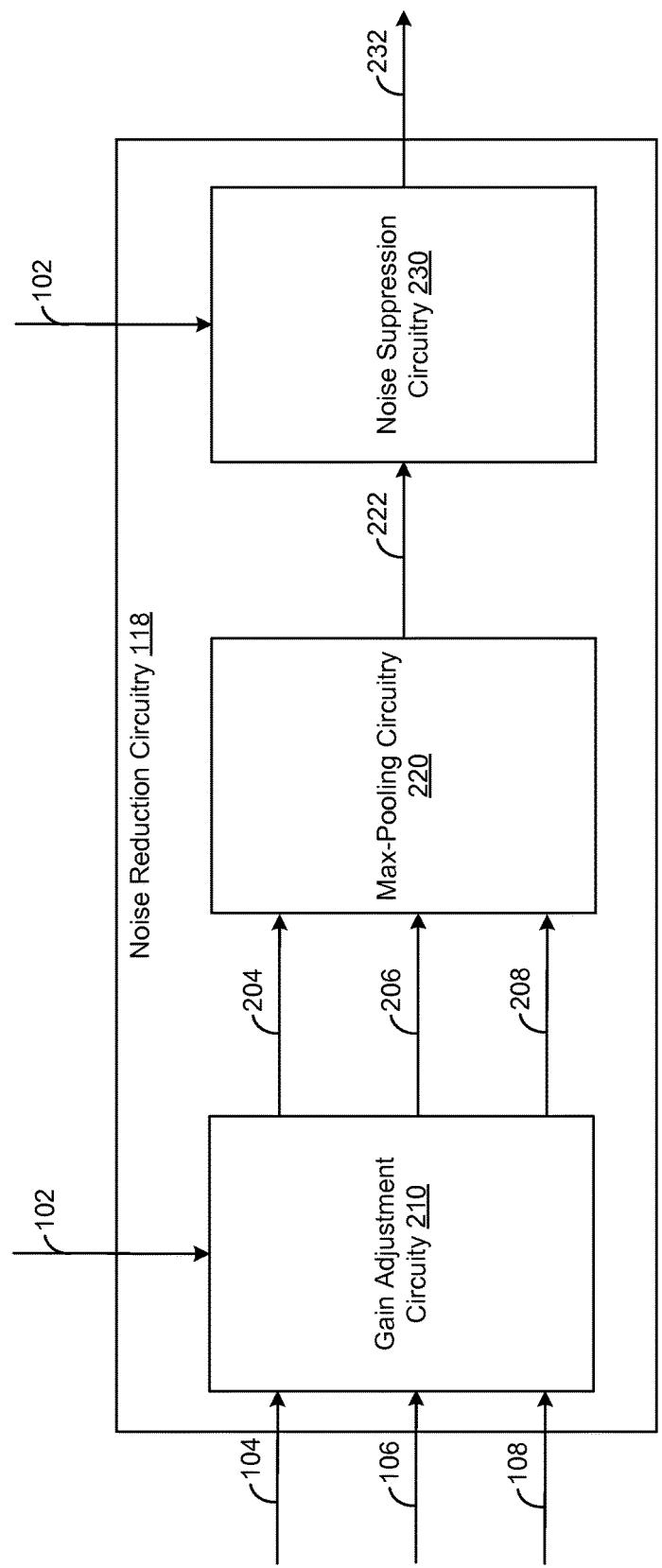
FIG. 2 is a diagram of a noise reduction circuitry that is operable to suppress noise using audio signals captured from multiple devices.

Referring to FIG. 2, a diagram of the noise reduction circuitry 118 of FIG. 1 is shown. The noise reduction circuitry 118 includes gain adjustment circuitry 210, max-pooling circuitry 220, and noise suppression circuitry 230.

The gain adjustment circuitry 210 may be configured to receive the first audio signal 102, the second audio signal 104, the third audio signal 106, and the fourth audio signal 108. As described with respect to FIG. 1, the first audio signal 102 may be captured by a device associated with the noise reduction circuitry 118 (e.g., the first device 110 of FIG. 1) and the other audio signals 104, 106, 108 may be captured and transmitted to the noise reduction circuitry 118 by remote devices (e.g., the devices 120, 130, 140 of FIG. 1).

The gain adjustment circuitry 210 may be configured to apply the gain conditioning factor (G$_2$) to the second audio signal 104 to generate a second gain-adjusted audio signal 204. To determine the gain conditioning factor (G$_2$), the gain adjustment circuitry 210 may compare the speech (S) level of the first audio signal 102 to the second audio level (A$_2$) of the second audio signal 104 and compare the audio level of the secondary component $$\left(\frac{N_2}{D_2}\right)$$

of the first audio signal 102 to the second audio level (A$_2$) of the second audio signal 104. The gain conditioning factor ($G_2$) may be a value that, when applied to the second audio signal 104, causes an audio level of the second gain-adjusted audio signal 204 to be less than the speech (S) level of the first audio signal 102 and causes the audio level of the second gain-adjusted audio signal 204 to be greater than the audio level of the secondary component $$\left(\frac{N_2}{D_2}\right)$$

of the first audio signal 102. The second gain-adjusted audio signal 204 may be provided to the max-pooling circuitry 220. Because the second gain-adjusted audio signal 204 is based on the second audio signal 104, the second gain-adjusted audio signal 204 may have a primary component having the frequency ($f_2$).

The gain adjustment circuitry 210 may use a microphone gain calibration scheme to determine the gain conditioning factor ($G_2$) such that each microphone channel may have a substantially similar sensitivity gain for background ambient noise. According to one implementation, the gain adjustment circuitry 210 may operate based on the following pseudocode:

```
If delta_1= energy_mic_primary/energy_mic_sub>bias_1
    update gain_pre_conditioner_upperbound < delta_1*margin;
If delta_2=energy_mic_primary/energy_mic_sub<bias_2
    update gain_pre_conditioner_lowerbound > over_estim/bias_2;
If gain_pre_conditioner_upperbound >
gain_pre_conditioner_lowerbound
    final_gain_pre_conditioner = gain_pre_conditioner_lowerbound;
else
    final_gain_pre_conditioner=gain_pre_conditioner_upperbound;
```

Based on the pseudocode, delta_1 may correspond to the signal energy at the target (e.g., the first audio level ($A_1$) of the first audio signal 102) divided by the signal energy at the sub-device (e.g., the second audio level ($A_2$) of the second audio signal 104) and may be compared to a bias factor (bias_1). If delta_1 is greater than the bias factor (bias_1), then an upper margin of the second gain factor ($G_2$) may be less than delta_1 times a margin. Additionally, delta_1 may also correspond to the signal energy at the target divided by the signal energy at the sub-device. If delta_2 is less than a bias factor (bias_2), then a lower margin of the second gain factor ($G_2$) may be greater than an overestimation of noise level of the second audio signal 104 divided by the bias factor (bias_2).

The gain adjustment circuitry 210 may also be configured to apply the gain conditioning factor ($G_3$) to the third audio signal 106 to generate a third gain-adjusted audio signal 206. To determine the gain conditioning factor ($G_3$), the gain adjustment circuitry 210 may compare the speech (S) level of the first audio signal 102 to the third audio level ($A_3$) of the third audio signal 106 and compare the audio level of the secondary component $$\left(\frac{N_3}{D_3}\right)$$

of the first audio signal 102 to the third audio level ($A_3$) of the third audio signal 106. The gain conditioning factor ($G_3$) may be a value that, when applied to the third audio signal 106, causes an audio level of the third gain-adjusted audio signal 206 to be less than the speech (S) level of the first audio signal 102 and causes the audio level of the third gain-adjusted audio signal 206 to be greater than the audio level of the secondary component $$\left(\frac{N_3}{D_3}\right)$$

of the first audio signal 102. The third gain-adjusted audio signal 206 may be provided to the max-pooling circuitry 220. Because the third gain-adjusted audio signal 206 is based on the third audio signal 106, the third gain-adjusted audio signal 206 may have a primary component having the frequency ($f_3$). According to one implementation, the gain adjustment circuitry 210 may use the above pseudocode to determine the gain conditioning factor ($G_3$).

The gain adjustment circuitry 210 may also be configured to apply the gain conditioning factor ($G_4$) to the fourth audio signal 108 to generate a fourth gain-adjusted audio signal 208. To determine the gain conditioning factor ($G_4$), the gain adjustment circuitry 210 may compare the speech (S) level of the first audio signal 102 to the fourth audio level ($A_4$) of the fourth audio signal 108 and compare the audio level of the secondary component $$\left(\frac{N_4}{D_4}\right)$$

of the first audio signal 102 to the fourth audio level ($A_4$) of the fourth audio signal 108. The gain conditioning factor ($G_4$) may be a value that, when applied to the fourth audio signal 108, causes an audio level of the fourth gain-adjusted audio signal 208 to be less than the speech (S) level of the first audio signal 102 and causes the audio level of the fourth gain-adjusted audio signal 208 to be greater than the audio level of the secondary component $$\left(\frac{N_4}{D_4}\right)$$

of the first audio signal 102. The fourth gain-adjusted audio signal 208 may be provided to the max-pooling circuitry 220. Because the fourth gain-adjusted audio signal 208 is based on the fourth audio signal 108, the fourth gain-adjusted audio signal 208 may have a primary component having the frequency ($f_4$). According to one implementation, the gain adjustment circuitry 210 may use the above pseudocode to determine the gain conditioning factor ($G_4$).

The max-pooling circuitry 220 may be configured to perform a max-pooling operation on the gain-adjusted audio signals 204, 206, 208 to generate a non-target reference signal 222. For example, the max-pooling circuitry 220 may "pool" the gain-adjusted audio signals 204, 206, 208 to determine the "maximum" gain for each frequency ($f_2$-$f_4$). For example, assuming the second gain-adjusted signal 204 includes a signal component at the frequency ($f_2$) having a gain that is greater than the gain of the signal components at the frequency ($f_2$) for the other gain-adjusted signals 206, 208, the max-pooling circuitry 220 may select the signal component of the second gain-adjusted signal 204 at the frequency ($f_2$) to include in the non-target reference signal 222. Assuming the third gain-adjusted signal 206 includes a signal component at the frequency ($f_3$) having a gain that is greater than the gain of the signal components at the frequency ($f_3$) for the other gain-adjusted signals 204, 208, the max-pooling circuitry 220 may select the signal component of the third gain-adjusted signal 206 at the frequency ($f_3$) to include in the non-target reference signal 222. Assuming the fourth gain-adjusted signal 208 includes a signal component at the frequency ($f_4$) having a gain that is greater than the gain of the signal components at the frequency ($f_4$) for the other gain-adjusted signals 204, 206, the max-pooling circuitry 220 may select the signal component of the fourth gain-adjusted signal 208 at the frequency ($f_4$) to include in the non-target reference signal 222.

The max-pooling circuitry 220 may combine the selected signal component for each frequency ($f_2$-$f_4$) to generate the non-target reference signal 222. The non-target reference signal 222 may be provided to the noise suppression circuitry 230. The noise suppression circuitry 230 may combine the non-target reference signal 222 with the first audio signal 102 to generate a target signal 232. The target signal 232 may include a substantial amount of the speech (S) in the first audio signal 102 and a reduced amount of noise in the first audio signal 102. For example, the signal component of the second gain-adjusted signal 204 at the frequency ($f_2$) in the non-target reference signal 222 may substantially suppress the secondary component $$\left(\frac{N_2}{D_2}\right)$$

of the first audio signal 102. The signal component of the third gain-adjusted signal 206 at the frequency ($f_3$) in the non-target reference signal 222 may substantially suppress the secondary component $$\left(\frac{N_3}{D_3}\right)$$

of the first audio signal 102. The signal component of the fourth gain-adjusted signal 208 at the frequency ($f_4$) in the non-target reference signal 222 may substantially suppress the secondary component $$\left(\frac{N_4}{D_4}\right)$$

of the first audio signal 102.

The noise reduction circuitry 118 of FIG. 2 may reduce noise components $$\left(\frac{N_2}{D_2} + \frac{N_3}{D_3} + \frac{N_4}{D_4}\right)$$

of the first audio signal 102 using audio signals 104, 106, 108 captured by microphones 124, 134, 144 of other devices 120, 130, 140. For example, non-target source suppression (e.g., noise suppression) may be used by the noise reduction circuitry 118 to aggregate the responses of the microphones 124, 134, 144 as the non-target reference signal 222 that is used to enhance a target audio event (e.g., the speech (S) component of the first audio signal 102) captured by the microphone 114.

Figure 3:
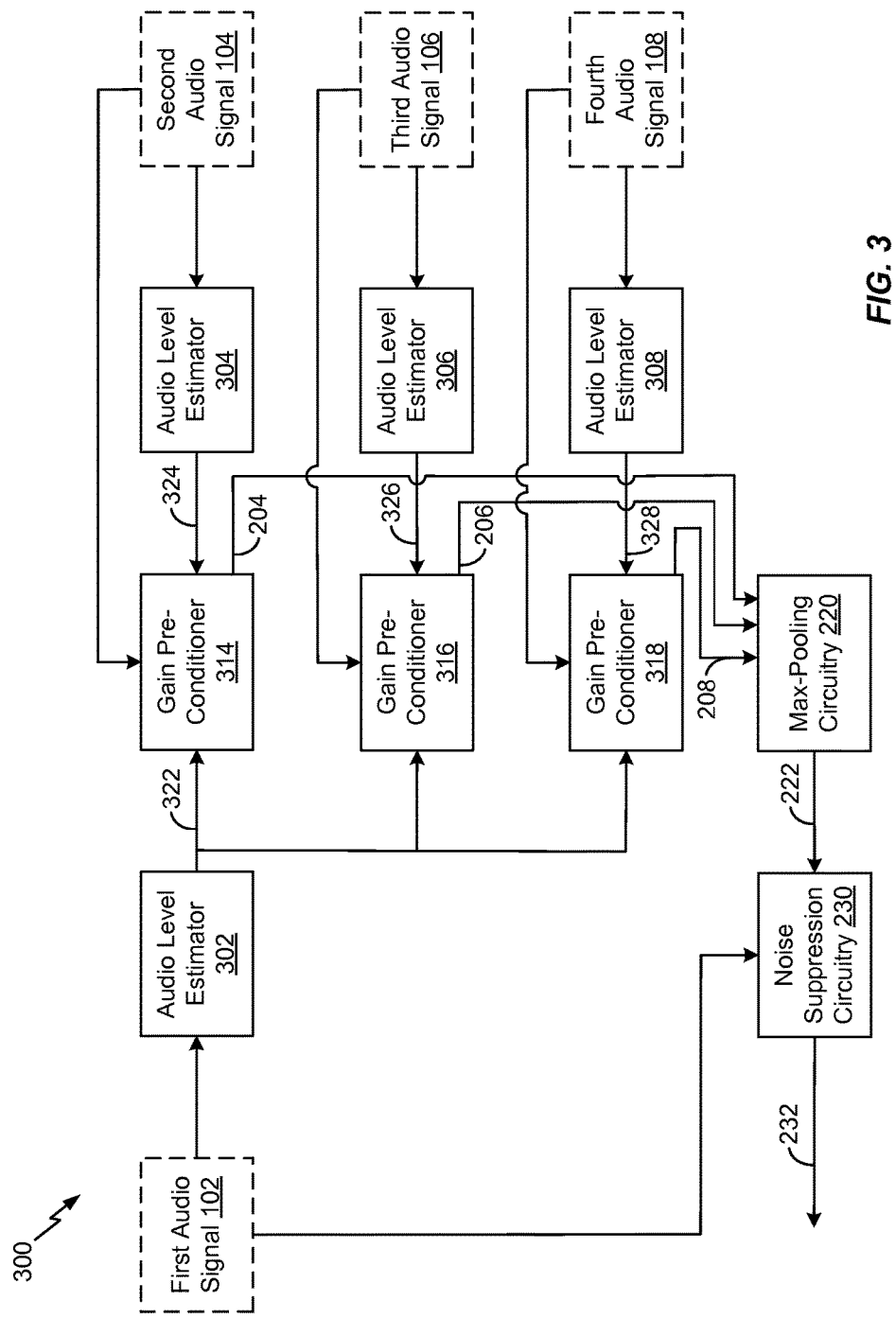
FIG. 3 is another system that is operable to suppress noise using audio signals captured from multiple devices.

Referring to FIG. 3, a system 300 that is operable to suppress noise using audio signals captured from multiple devices in conjunction with the techniques of FIGS. 1-2 is shown. The system 300 includes an audio level estimator 302, an audio level estimator 304, an audio level estimator 308, a gain pre-conditioner 314, a gain pre-conditioner 316, a gain pre-conditioner 318, the max-pooling circuitry 220, and the noise suppression circuitry 230. According to one implementation, some (or all) of the components in the system 300 may be integrated into the noise reduction circuitry 118 of FIG. 1.

The first audio signal 102 may be provided to the audio level estimator 302. The audio level estimator 302 may measure the first audio level ($A_1$) of the first audio signal 102 and may generate a signal 322 indicating the first audio level ($A_1$). The signal 322 may be provided to the gain pre-conditioners 314, 316, 318.

The second audio signal 104 may be provided to the audio level estimator 304 and to the gain pre-conditioner 314. The audio level estimator 304 may measure the second audio level ($A_2$) of the second audio signal 104 and may generate a signal 324 indicating the second audio level ($A_2$). The signal 324 may be provided to the gain pre-conditioner 314. The gain pre-conditioner 314 may be configured to apply the gain conditioning factor ($G_2$) to the second audio signal 104 to generate the second gain-adjusted audio signal 204. To determine the gain conditioning factor ($G_2$), the gain pre-conditioner 314 may compare the speech (S) level of the first audio signal 102 to the second audio level ($A_2$) of the second audio signal 104 and compare the audio level of the secondary component $$\left(\frac{N_2}{D_2}\right)$$

of the first audio signal 102 to the second audio level ($A_2$) of the second audio signal 104. The gain conditioning factor ($G_2$) may be a value that, when applied to the second audio signal 104, causes an audio level of the second gain-adjusted audio signal 204 to be less than the speech (S) level of the first audio signal 102 and causes the audio level of the second gain-adjusted audio signal 204 to be greater than the audio level of the secondary component $$\left(\frac{N_2}{D_2}\right)$$

of the first audio signal 102. The second gain-adjusted signal 204 may be provided to the max-pooling circuitry 220.

The third audio signal 106 may be provided to the audio level estimator 306 and to the gain pre-conditioner 316. The audio level estimator 306 may measure the third audio level ($A_3$) of the third audio signal 106 and may generate a signal 326 indicating the third audio level ($A_3$). The signal 326 may be provided to the gain pre-conditioner 316. The gain pre-conditioner 316 may be configured to apply the gain conditioning factor ($G_3$) to the third audio signal 106 to generate the third gain-adjusted audio signal 206. To determine the gain conditioning factor ($G_3$), the gain pre-conditioner 316 may compare the speech (S) level of the first audio signal 102 to the third audio level ($A_3$) of the third audio signal 106 and compare the audio level of the secondary component $$\left(\frac{N_2}{D_2}\right)$$

of the first audio signal 102 to the third audio level ($A_3$) of the third audio signal 106. The gain conditioning factor ($G_3$) may be a value that, when applied to the third audio signal 106, causes an audio level of the third gain-adjusted audio signal 206 to be less than the speech (S) level of the first audio signal 102 and causes the audio level of the third gain-adjusted audio signal 206 to be greater than the audio level of the secondary component $$\left(\frac{N_2}{D_2}\right)$$

of the first audio signal 102. The third gain-adjusted signal 206 may be provided to the max-pooling circuitry 220.

The fourth audio signal 108 may be provided to the audio level estimator 308 and to the gain pre-conditioner 318. The audio level estimator 308 may measure the fourth audio level ($A_4$) of the fourth audio signal 108 and may generate a signal 328 indicating the fourth audio level ($A_4$). The signal 328 may be provided to the gain pre-conditioner 318. The gain pre-conditioner 318 may be configured to apply the gain conditioning factor ($G_4$) to the fourth audio signal 108 to generate the fourth gain-adjusted audio signal 208. To determine the gain conditioning factor ($G_4$), the gain pre-conditioner 318 may compare the speech (S) level of the first audio signal 102 to the fourth audio level ($A_4$) of the fourth audio signal 108 and compare the audio level of the secondary component $$\left(\frac{N_2}{D_2}\right)$$

of the first audio signal 102 to the fourth audio level ($A_4$) of the fourth audio signal 108. The gain conditioning factor ($G_4$) may be a value that, when applied to the fourth audio signal 108, causes an audio level of the fourth gain-adjusted audio signal 208 to be less than the speech (S) level of the first audio signal 102 and causes the audio level of the fourth gain-adjusted audio signal 208 to be greater than the audio level of the secondary component $$\left(\frac{N_2}{D_2}\right)$$

of the first audio signal 102. The fourth gain-adjusted signal 208 may be provided to the max-pooling circuitry 220.

The max-pooling circuitry 220 may operate in a substantially similar manner as described with respect to FIG. 2. For example, the max-pooling circuitry 220 may generate the non-target reference signal 222 based on the gain-adjusted audio signals 204, 206, 208. The non-target reference signal 222 may be provided to the noise suppression circuitry 230. The noise suppression circuitry 230 may operate in a substantially similar manner as described with respect to FIG. 2. For example, the noise suppression circuitry 230 may generate the target signal 232 based on the non-target reference signal 222 and the first audio signal 102.

The system 300 of FIG. 3 may reduce noise components $$\left(\frac{N_2}{D_2}+\frac{N_3}{D_3}+\frac{N_4}{D_4}\right)$$

of the first audio signal 102 using audio signals 104, 106, 108 captured by microphones 124, 134, 144 of other devices 120, 130, 140. For example, non-target source suppression (e.g., noise suppression) may be used by the noise reduction circuitry 118 to aggregate the responses of the microphones 124, 134, 144 as the non-target reference signal 222 that is used to enhance a target audio event (e.g., the speech (S) component of the first audio signal 102) captured by the microphone 114.

Figure 4:
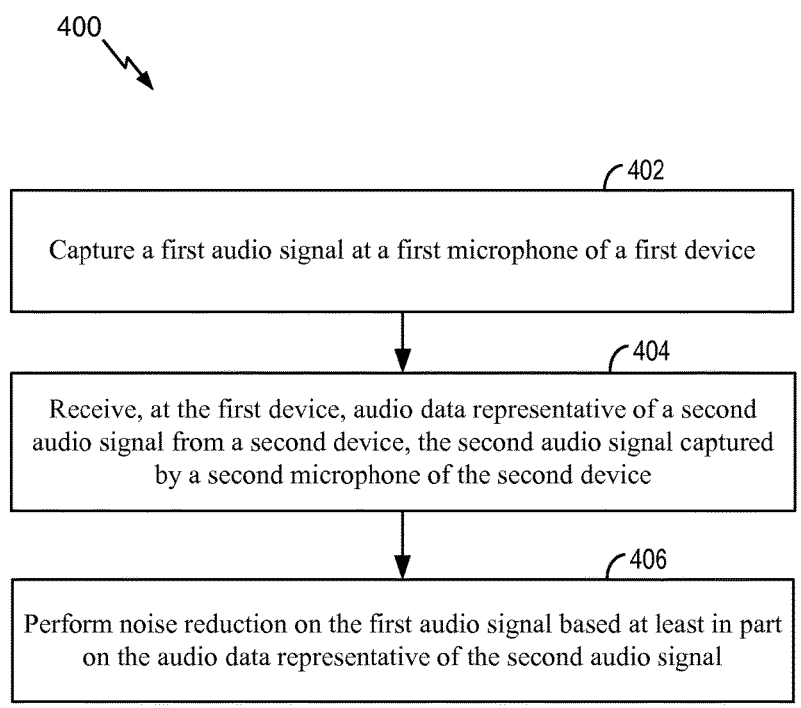
FIG. 4 is a method for performing noise reduction using audio signals captured from multiple devices.

Referring to FIG. 4, a method 400 for performing noise reduction using audio signals captured from multiple devices is shown. The method 400 may be performed using the first device 110 of FIG. 1, the noise reduction circuitry 118 of FIGS. 1-2, the system 300 of FIG. 3, or a combination thereof.

The method 400 includes capturing a first audio signal at a first microphone of a first device, at 402. For example, referring to FIG. 1, the microphone 114 may capture the first audio signal 102.

Audio data representative of a second audio signal may be received at the first device from a second device, at 404. The second audio signal may be captured by a second microphone of the second device. For example, referring to FIG. 1, the microphone 124 may capture the second audio signal 104. The transceiver 112 of the first device 110 may receive the audio data 154 representative of the second audio signal 104 from the second device 120. According to one implementation, the method 400 may also include receiving audio data representative of a third audio signal from a third device. The third audio signal may be captured by a third microphone of the third device. For example, referring to FIG. 1, the microphone 134 may capture the third audio signal 106. The transceiver 112 may receive the audio data 156 representative of the third audio signal 106 from the third device 130.

Noise reduction may be performed on the first audio signal based at least in part on the audio data representative of the second audio signal, at 406. For example, referring to FIGS. 1-2, the noise reduction circuitry 118 may generate the target signal 232 based at least in part on the audio data 154 representative of the second audio signal 104. To illustrate, the gain adjustment circuitry 210 may apply the gain conditioning factor ($G_2$) to the audio data 154 representative of the second audio signal 104 to generate the second gain-adjusted audio signal 204. The max-pooling circuitry 220 may generate the non-target reference signal 222 based at least in part on second gain-adjusted audio signal 204, and the noise suppression circuitry 230 may generate the target signal 232 (e.g., perform noise suppression on the first audio signal 102) based on the non-target reference signal 222. Thus, the method 400 may include performing, at the first device, noise reduction on the first audio signal based at least in part on the audio data representative of the second audio signal. According to the one implementation of the method 400, performing the noise reduction on the first audio signal may also be based on the audio data representative of the third audio signal. To illustrate, the gain adjustment circuitry 210 may apply the gain conditioning factor ($G_3$) to the audio data 156 representative of the third audio signal 106 to generate the third gain-adjusted audio signal 206. The non-target reference signal 222 may also be based on third gain-adjusted audio signal 206.

According to one implementation, the method 400 may include performing first gain pre-conditioning on the second audio signal to generate a first gain-adjusted audio signal and performing second gain-preconditioning on the third audio signal to generate a second gain-adjusted audio signal. The "first gain-adjusted audio signal" according to the method 400 may correspond to the second gain-adjusted audio signal 204 of FIG. 2, and the "second gain-adjusted audio signal" according to the method 400 may correspond to the third gain-adjusted audio signal 206 of FIG. 2. Performing the first gain pre-conditioning on the second audio signal may include applying a gain conditioning factor to the second audio signal. According to one implementation, the first gain-preconditioning may be performed based on energy levels of the first audio signal and the second audio signal.

According to one implementation, the method 400 may include generating a non-target reference signal based on the first gain-adjusted audio signal and the second gain-adjusted audio signal. The non-target reference signal may be generated using a max-pooling operation, and performing the noise reduction may include combining the first audio signal with the non-target reference signal.

The method 400 of FIG. 4 may reduce noise components $$\left(\frac{N_2}{D_2} + \frac{N_3}{D_3} + \frac{N_4}{D_4}\right)$$

of the first audio signal 102 using audio signals 104, 106, 108 captured by microphones 124, 134, 144 of other devices 120, 130, 140. For example, non-target source suppression (e.g., noise suppression) may be used by the noise reduction circuitry 118 to aggregate the responses of the microphones 124, 134, 144 as the non-target reference signal 222 that is used to enhance a target audio event (e.g., the speech (S) component of the first audio signal 102) captured by the microphone 114. An enhanced target audio event may enable audio processing circuitry within the first device 110 to perform voice-activated functions. For example, the first audio signal 102 may include speech from a user of the first device 110. The speech may include one or more commands that initiate a voice-activated function at the first device 110. Enhancing the target audio event (e.g., enhancing the speech) by suppressing non-target sources may enable the audio processing circuitry to more accurately detect the speech to perform the voice-activated functions.

Figure 5:
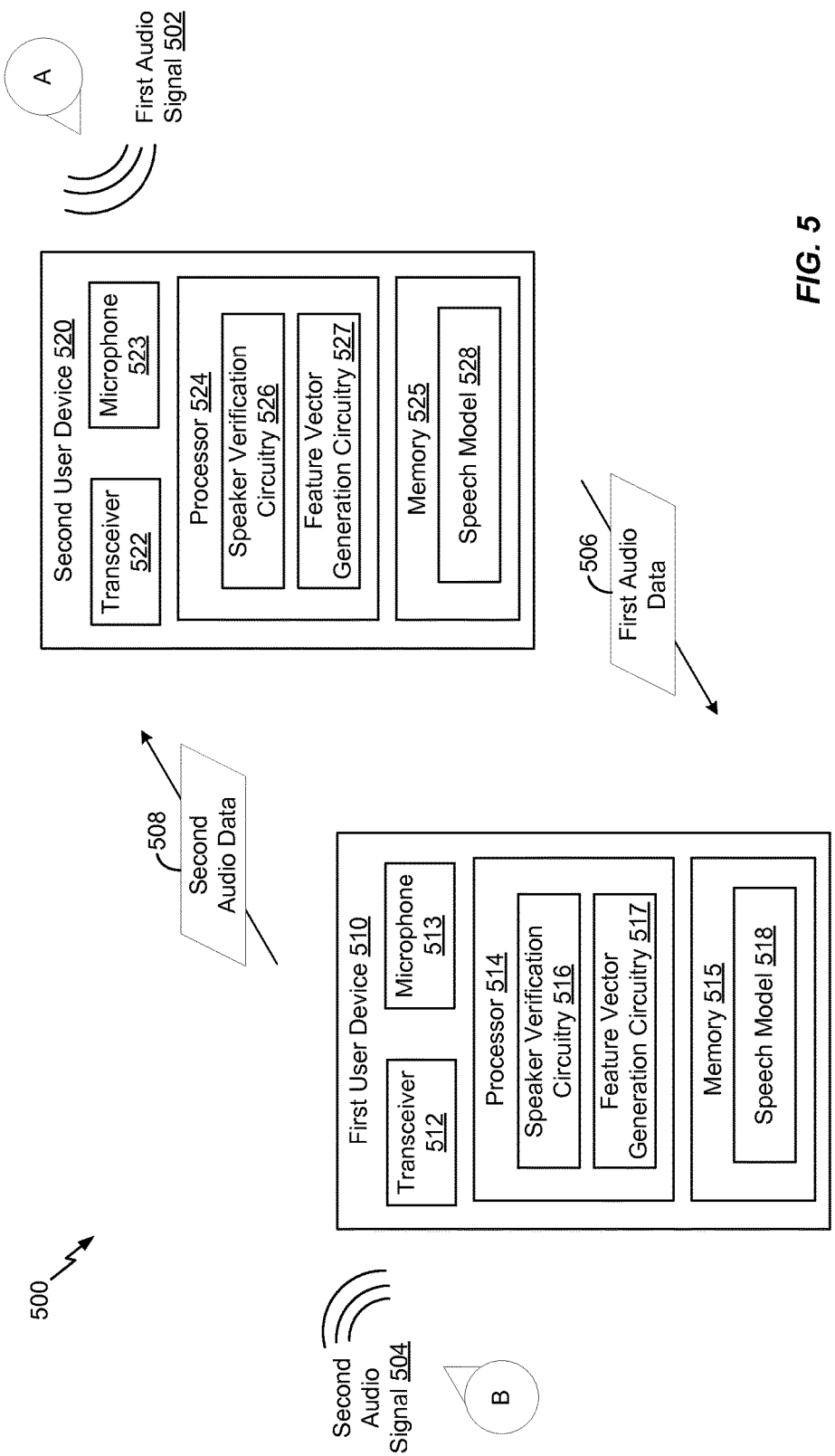
FIG. 5 is a system that is operable to perform speaker verification and speaker recognition using audio data.

Referring to FIG. 5, a system 500 that is operable to perform speaker verification and speaker recognition using audio data is shown. The system 500 includes a first user device 510 and a second user device 520. Each user device 510, 520 may be an electronic device that is operable to capture surrounding audio sounds via a microphone. Although two user devices 510, 520 are depicted in the system 500, in other implementations, the voice recognition techniques described herein may be implemented using additional user devices. As non-limiting examples, the voice recognition techniques described herein may be implemented using eight user devices. According to one implementation, the first user device 510 may correspond to the first device 110 of FIG. 1 and may be operable to perform the noise suppression techniques described with respect to FIGS. 1-4.

According to one implementation, one or more of the user devices 510, 520 may be a wireless communications device (e.g., a mobile phone). However, in other implementations, one or more of the user devices 510, 520 may be other electronic devices operable to perform voice recognition techniques. As non-limiting examples, one or more of the user devices 510, 520 may be a laptop computer, a computer, a tablet, a PDA, etc. The first user device 510 may be associated with a first speaker (A) having a first voice, and the second user device 520 may be associated with a second speaker (B) having a second voice. For example, the first user device 510 may be registered with the first speaker (A), and the second user device 520 may be registered with the second speaker (B).

The first user device 510 includes a transceiver 512, a microphone 513, a processor 514, and a memory 515. According to one implementation, in lieu of the transceiver 512, the first user device 510 may include a receiver and a transmitter. The processor 514 includes speaker verification circuitry 516 and feature vector generation circuitry 517. The memory 515 includes a speech model 518. As described below, the speech model 518 includes data that indicates audio properties of the first voice of the first speaker (A).

The second user device 520 includes a transceiver 522, a microphone 523, a processor 524, and a memory 525. According to one implementation, in lieu of the transceiver 522, the second user device 520 may include a receiver and a transmitter. The processor 524 includes speaker verification circuitry 526 and feature vector generation circuitry 527. The memory 525 includes a speech model 528. As described below, the speech model 528 includes data that indicates audio properties of the second voice of the second speaker (B).

The first speaker (A) may speak and generate a first audio signal 502 that includes the first voice. According to the layout of the system 500, the first speaker (A) may be relatively close in proximity to the second user device 520. Thus, the microphone 523 of the second user device 520 may capture the first audio signal 502 that includes the first voice. Upon capturing the first audio signal 502, the feature vector generation circuitry 527 may be configured to generate one or more models (e.g., speech models) based on the first audio signal 502. The feature vector generation circuitry 527 may generate first audio data 506 (e.g., one or more feature vectors) based on the one or more models. Upon generation of the first audio data 506, the transceiver 522 may transmit the first audio data 506 to the first user device 510. The first audio data 506 may be directly transmitted to the first user device 510 or indirectly transmitted to the first user device 510. Non-limiting examples of direct transmission include IEEE 802.11 (e.g., "Wi-Fi") peer-to-peer transmissions, infrared transmissions, etc. Non-limiting examples of indirect transmission include cellular transmissions, network-based transmissions, cloud-based transmissions, etc.

According to another implementation, the second user device 520 may transmit the first audio signal 502 (or a copy of the first audio signal 502) to the first user device 510. Upon receiving the first audio signal 502 from the second user device 520, the feature vector generation circuitry 517 of the first user device 510 may be configured to generate one or more models (e.g., speech models) based on the first audio signal 502. For example, the first audio data 506 may be generated at the first user device 510 as opposed to being generated at the second user device 520 and transmitted to the first user device 510.

The first user device 510 may receive the first audio data 506 from the second user device 520 (or generate the first audio data 506 from a copy of the first audio signal 502 provided by the second user device 520) and may perform a speaker verification function and/or a speaker recognition function based on the first audio data 506 to match a person speaking (e.g., the first speaker (A)) to one or more people associated with voice-activated commands at the first user device 510. For example, the transceiver 512 may be configured to receive the first audio data 506, and the speaker verification circuitry 516 may perform the speaker verification function based on the first audio data 506 to determine whether the voice associated with the first audio data 506 belongs to the first speaker (A).

To illustrate, the speaker verification circuitry 516 may be configured to determine a likelihood value (e.g., a score or "maximum likelihood") that indicates whether the first speaker (A) is associated with the voice-activated commands at the first user device 510 based on the one or more feature vectors in the first audio data 506. For example, the speaker verification circuitry 516 may retrieve the speech model 518 from the memory 515. The speech model 518 may indicate audio properties (e.g., frequencies, pitch, etc.) of one or more people associated with the voice-activated commands at the first user device 510. For example, the audio properties of the first voice in the speech model 518 may be indicated using voice models and/or audio models. Upon retrieving the speech model 518, the speaker verification circuitry 516 may compare the one or more feature vectors in the first audio data 506 to the voice/audio models in the speech model 518.

The speaker verification circuitry 516 may determine the likelihood value (that the first speaker (A) is associated with the voice-activated commands at the first user device 510) based on the comparison. For example, the speaker verification circuitry 516 may compare a frequency, pitch, or a combination thereof, of the one or more feature vectors to a frequency, pitch, or a combination thereof, of the voice/audio models in the speech model 518. If the frequency/pitch is substantially identical, the likelihood value may be relatively high (e.g., may satisfy a threshold). If the frequency/pitch is not substantially identical, the likelihood value may be relatively low (e.g., may not satisfy the threshold). Upon determining the likelihood value, the speaker verification circuitry 516 may determine whether the likelihood value satisfies the threshold. If the likelihood value satisfies the threshold, the processor 514 may enable one or more functions at the first user device 510. For example, the processor 514 may enable one or more voice-activated functions, such as making a call, providing information, etc. According to one implementation, the first audio data 506 may include a copy of the first audio signal 502, and the voice-activated functions may be based on speech in the copy of the first audio signal 502.

The second speaker (B) may speak and generate a second audio signal 504 that includes the second voice. The second speaker (B) may be relatively close in proximity to the first user device 510. Thus, the microphone 513 of the first user device 510 may capture the second audio signal 504 that includes the second voice. Upon capturing the second audio signal 504, the feature vector generation circuitry 517 may be configured to generate one or more models (e.g., speech models) based on the second audio signal 504. The feature vector generation circuitry 517 may generate second audio data 508 (e.g., one or more feature vectors) based on the one or more models. Upon generation of the second audio data 508, the transceiver 512 may transmit the second audio data 508 to the second user device 520.

The second user device 520 may receive the second audio data 508 and may perform a speaker verification function and/or a speaker recognition function based on the second audio data 508 to match a person speaking (e.g., the second speaker (B)) to one or more people associated with voice-activated commands at the second user device 520. For example, the transceiver 522 may be configured to receive the second audio data 508, and the speaker verification circuitry 526 may perform the speech verification function based on the second audio data 508 to determine whether the voice associated with the second audio data 508 belongs to the second speaker (B).

To illustrate, the speaker verification circuitry 526 may be configured to determine a likelihood value (e.g., a score or "maximum likelihood") that indicates whether the second speaker (B) is associated with the voice-activated commands at the second user device 520 based on the one or more feature vectors in the second audio data 508. For example, the speaker verification circuitry 526 may retrieve the speech model 528 from the memory 525. The speech model 528 may indicate audio properties of one or more people associated with the voice-activated commands at the second user device 520. For example, the audio properties of the second voice in the speech model 528 may be indicated using voice models and/or audio models. Upon retrieving the speech model 528, the speaker verification circuitry 526 may compare the one or more feature vectors in the second audio data 508 to the voice/audio models in the speech model 528.

The speaker verification circuitry 526 may determine the likelihood value (that the second speaker (B) is associated with the voice-activated commands at the second user device 520) based on the comparison. Upon determining the likelihood value, the speaker verification circuitry 526 may determine whether the likelihood value satisfies a threshold. If the likelihood value satisfies the threshold, the processor 524 may enable one or more functions at the second user device 520. For example, the processor 524 may enable one or more voice-activated functions, such as making a call, providing information, etc. According to one implementation, the second audio data 508 may include a copy of the second audio signal 504, and the voice-activated functions may be based on speech in the copy of the second audio signal 504.

The system 500 of FIG. 5 may enable a user (e.g., the first speaker (A) and/or the second speaker (B)) to speak near a user device that is not the user's own device and enable voice-activated functionality at the user's own device. For example, the first speaker (A) may speak near the second speaker's (B) device (e.g., the second user device 520) and voice-activated functionality may be enabled at the first speaker's (A) device (e.g., the first user device 510). Because the user devices 510, 520 share feature vectors (e.g., the audio data 506, 508), and not voice or audio models (e.g., the speech models 518, 528), proprietary voice or audio models are not shared with other user devices.

Figure 6:
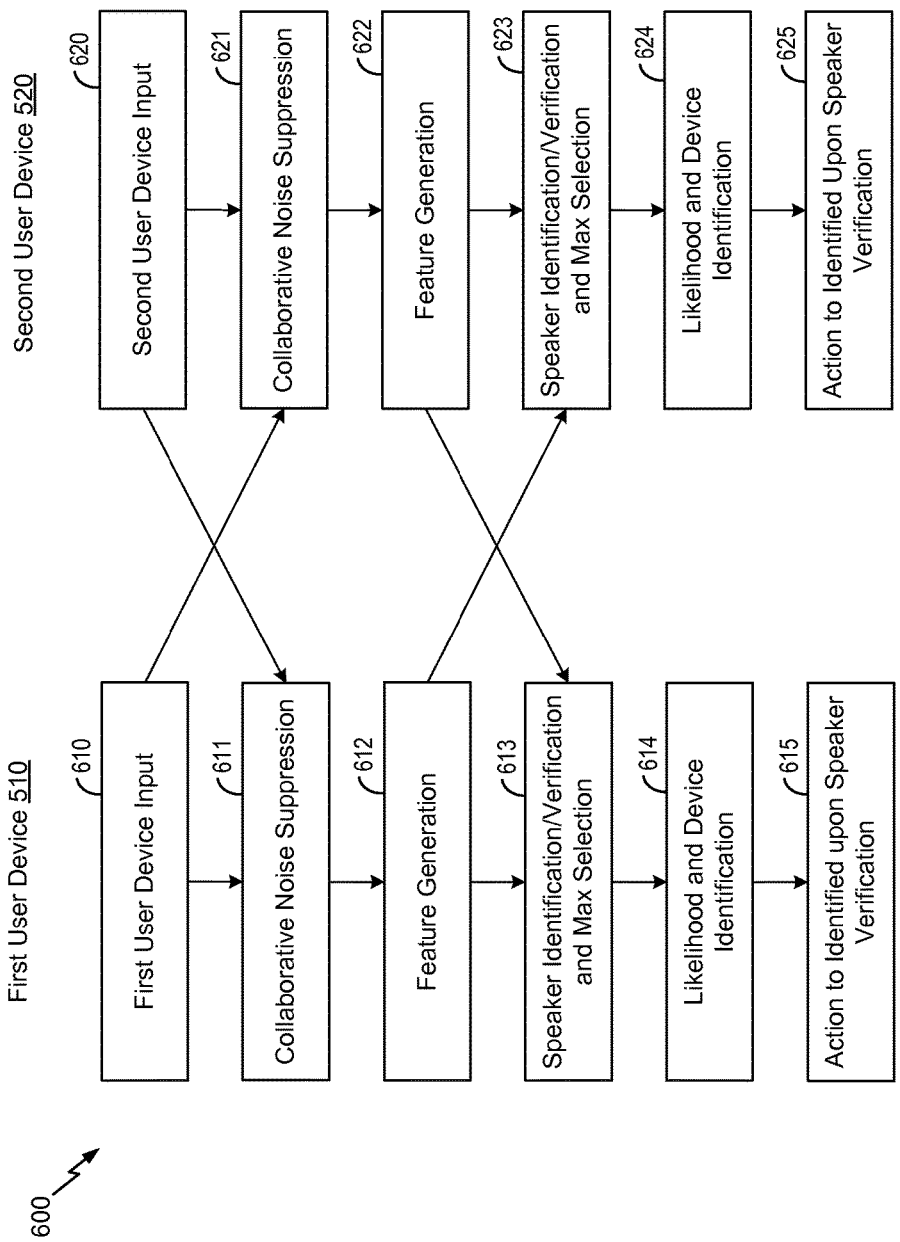
FIG. 6 is a process flow diagram for speaker verification and speaker recognition using audio data.

Referring to FIG. 6, a process flow diagram 600 for speaker verification and speaker recognition using audio data is shown. The steps in the process flow diagram 600 may be performed using the first device 110 of FIG. 1, the first user device 510 of FIG. 5, the second user device 520 of FIG. 5, or a combination thereof. For ease of illustration, the process flow diagram 600 is explained with respect to the system 500 of FIG. 5, unless otherwise noted.

The first user device 510 may receive a first user device input 610. For example, the first user device 510 may receive the second audio signal 504 of FIG. 5. The first user device 510 may also provide the first user device input 610 to the second user device 520 for collaborative noise suppression, as described below. The second user device 520 may receive a second user device input 620. For example, the second user device 520 may receive the first audio signal 502 of FIG. 5. The second user device 520 may provide the second user device input 620 to the first user device 510 for collaborative noise suppression, as described below.

At 611, the first user device 510 may perform collaborative noise suppression to substantially reduce or suppress noise associated with the second user device input 620. The first user device 510 may use the noise suppression techniques described with respect to FIG. 1 to suppress noise (associated with the second user device input 620) captured by the first user device 510. For example, the second user device 520 may provide (e.g., "share") the second user device input 620 with the first user device 510 to suppress noise interference and reverberation. The first user device 510 may perform a gain pre-conditioning operation and a max-pooling operation on the device inputs 610, 620 to substantially isolate the first user device input 610. At 621, the second user device 520 may perform collaborative noise suppression to substantially reduce or suppress noise associated with the first user device input 610. The second user device 520 may use the noise suppression techniques described with respect to FIG. 1 to suppress noise (associated with the first user device input 610) captured by the second user device 520. For example, the first user device 510 may provide the first user device input 610 with the second user device 520 to suppress noise interference and reverberation. The second user device 520 may perform a gain pre-conditioning operation and a max-pooling operation on the device inputs 610, 620 to substantially isolate the second user device input 620.

At 612, the first user device 510 may generate features (e.g., one or more feature vectors) based on the first user device input 610 after noise associated with the second user device input 620 has been suppressed. At 614, the second user device 520 may generate features based on the second user device input 620 after noise associated with the first user device input 610 has been suppressed. The first user device 510 may provide the generated features (e.g., the first audio data 506 of FIG. 5) to the second user device 520, and the second user device 520 may provide the generated features (e.g., the second audio data 508 of FIG. 5) to the first user device 510. Sharing the generated features may enable each user device 510, 520 to perform a speaker verification function, as described below, without sharing individual speaker models (e.g., the speech models 518, 528 of FIG. 5).

At 613, the first user device 510 may perform speaker identification/verification and maximum value selection for the feature vectors generated at the first user device 510 and for the feature vectors generated at the second user device 520. For example, for a given frame, the first user device 510 may choose a maximum value of the feature vectors. At 614, the first user device 510 may determine the likelihood that the maximum value of the feature vector generated at the first user device 510 indicates that the first user device input 610 is associated with a speaker of the first user device 510. The first user device 510 may also determine the likelihood that the maximum value of the feature vector generated at the second user device 520 indicates that the second user device input 620 is associated with a speaker of the first user device 510.

At 615, the first user device 510 may perform an identified action (e.g., a voice-activated function) based on speaker verification. For example, the first user device 510 may perform a function based on the first user device input 610 upon verifying the first user device input 610 is associated with speech from an authorized user of the first user device 510. As a non-limiting example, if the first user device input 610 corresponds to user speech that states "what is the weather like in San Diego today?" The first user device 510 may output a message that states "very sunny today as usual with an 80 degree high and a 65 degree low." The first user device 510 may perform a similar function based on the second user device input 620 upon verifying the second user device input 620 is associated with speech from an authorized user of the first user device 510. According to one implementation, the first user device 510 may instruct (e.g., send a message instructing) the second user device 520 (or another device) to output the message.

At 623, the second user device 520 may perform speaker identification/verification and maximum value selection for the feature vectors generated at the first user device 510 and for the feature vectors generated at the second user device 520. For example, for a given frame, the second user device 520 may choose a maximum value of the feature vectors. At 624, the second user device 520 may determine the likelihood that the maximum value of the feature vector generated at the first user device 510 indicates that the first user device input 610 is associated with a speaker of the second user device 520. The second user device 520 may also determine the likelihood that the maximum value of the feature vector generated at the second user device 520 indicates that the second user device input 620 is associated with a speaker of the second user device 520.

At 625, the second user device 510 may perform an identified action (e.g., a voice-activated function) based on speaker verification. For example, the second user device 520 may perform a function based on the first user device input 610 upon verifying the first user device input 610 is associated with speech from an authorized user of the second user device 520. Alternatively, the second user device 520 may perform a similar function based on the second user device input 620 upon verifying the second user device input 620 is associated with speech from an authorized user of the second user device 520.

The process flow diagram 600 of FIG. 6 may enable a user to speak near a user device that is not the user's own device and enable voice-activated functionality at the user's own device. For example, feature vectors from inputs 610, 620 captured at the user devices 510, 520 may be provided to each user device 510, 520 for speaker verification. Upon verifying that an input is associated with speech from an authorized user of a device, the device may perform an action associated with the input.

Figure 7:
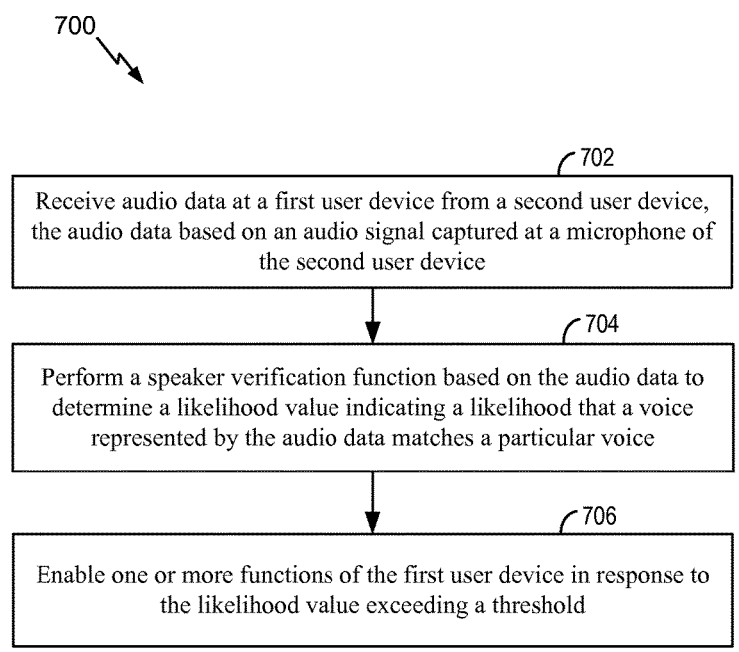
FIG. 7 is a method for performing speaker verification and speaker recognition using audio data.

Referring to FIG. 7, a method 700 for performing speaker verification and speaker recognition using audio data is shown. The method 700 may be performed using the first device 110 of FIG. 1, the first user device 510 of FIG. 5, or the second user device 520 of FIG. 5.

The method 700 includes receiving audio data at a first user device from a second user device, at 702. The audio data may be based on an audio signal captured at a microphone of the second user device. For example, referring to FIG. 7, the first user device 510 may receive the first audio data from the second user device 520. The first audio data

506 may be based on the first audio signal 502 captured at the microphone 523 of the second user device 520.

A speaker verification function may be performed based on the audio data to determine a likelihood value indicating a likelihood that a voice represented by the audio data matches a particular voice, at 704. For example, referring to FIG. 5, the speaker verification circuitry 516 may determine the likelihood value that indicates whether the first speaker (A) is associated with the voice-activated commands at the first user device 510 based on the one or more feature vectors in the first audio data 506. For example, the speaker verification circuitry 516 may retrieve the speech model 518 from the memory 515. Upon retrieving the speech model 518, the speaker verification circuitry 516 may compare the one or more feature vectors in the first audio data 506 to the voice/audio models in the speech model 518. The speaker verification circuitry 516 may determine the likelihood value based on the comparison.

One or more functions of the first user device may be enabled in response to the likelihood value exceeding a threshold, at 706. For example, referring to FIG. 5, the speaker verification circuitry 516 may determine whether the likelihood value satisfies a threshold. If the likelihood value satisfies the threshold, the processor 514 may enable one or more functions at the first user device 510. For example, the processor 514 may enable one or more voice-activated functions, such as making a call, providing information, etc.

According to one implementation of the method 700, the audio data includes one or more feature vectors based on the audio signal. Performing the speaker verification function may include comparing the one or more features vectors to a speech model stored at the first user device and determining the likelihood valued based on the comparison. The speech model may indicate audio properties of the particular voice and audio properties for one or more additional voices. The particular voice may be associated with the first user device. According to one implementation of the method 700, the one or more functions may include a voice-activated function (e.g., an audio call).

The method 700 of FIG. 7 may enable a user (e.g., the first speaker (A) and/or the second speaker (B)) to speak near a user device that is not the user's own device and enable voice-activated functionality at the user's own device. For example, the first speaker (A) may speak near the second speaker's (B) device (e.g., the second user device 520) and voice-activated functionality may be enabled at the first speaker's (A) device (e.g., the first user device 510). Because the user devices 510, 520 share feature vectors (e.g., the audio data 506, 508), and not voice or audio models (e.g., the speech models 518, 528), proprietary voice or audio models are not shared with other user devices.

Figure 8:
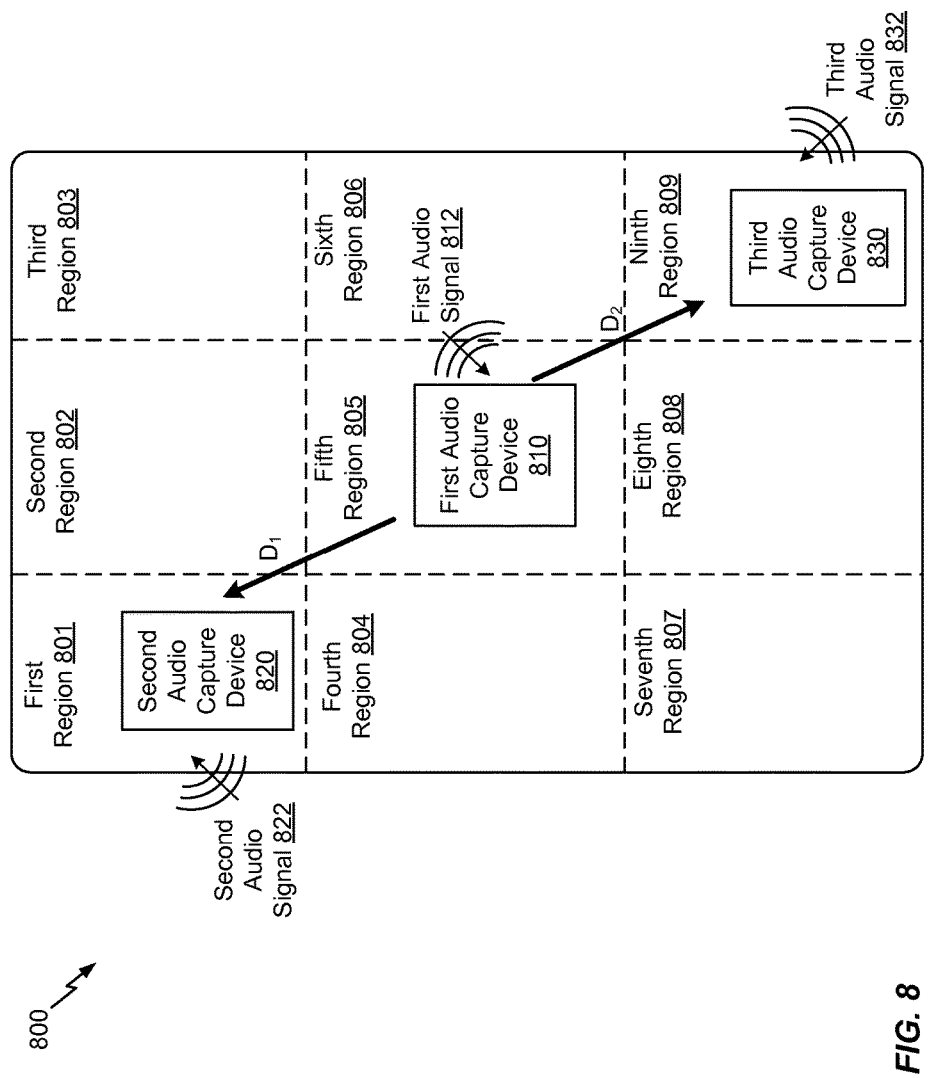
FIG. 8 is a graphical user interface (GUI) of a user device.

Referring to FIG. 8, a graphical user interface (GUI) 800 of a user device is shown. According to one implementation, the GUI 800 may be a GUI of the first device 110 of FIG. 1, the first user device 510 of FIG. 5, or the second user device 520 of FIG. 5.

The GUI 800 may display a representation of an area having multiple regions. Non-limiting examples of the area may include a room, a portion of a building, an outdoor area, etc. One or more audio capture devices 810, 820, 830 may be located in the area. According to FIG. 8, a first audio capture device 810 may be located in the area, a second audio capture device 820 may be located in the area, and a third audio capture device 830 may be located in the area. In the implementation of FIG. 8, the GUI 800 may be a GUI of the first audio capture device 810. Thus, the first audio capture device 810 may represent the device that is displaying the GUI 800. According to a particular implementation, the first audio capture device 810 may correspond to the first device 110 of FIG. 1, the first user device 510 of FIG. 5, or the second user device 520 of FIG. 5.

The first audio capture device 810 may be configured to capture a first audio signal 812, the second audio capture device 820 may be configured to capture a second audio signal 822, and the third audio capture device 820 may be configured to capture a third audio signal 832. Each audio capture device 810, 820, 830 may be operable to perform the noise suppression techniques described with respect to FIG. 1 and the speaker verification techniques described with respect to FIG. 5. As a non-limiting example, the second and third audio capture devices 820, 830 may be configured to send the second and third audio signal 822, 832, respectively, to the first audio capture device 810. The first audio capture device 810 may perform a gain pre-conditioning operation and a max-pooling operation on the audio signals 812, 822, 832 to substantially isolate the first audio signal 812.

As described above, the GUI 800 may display a representation of the area that includes the audio capture devices 810, 820, 830. For example, the GUI 800 may display a representation of a first region 801 of the area, a second region 802 of the area, a third region 803 of the area, a fourth region 804 of the area, a fifth region 805 of the area, a sixth region 806 of the area, a seventh region 807 of the area, an eighth region 808 of the area, and a ninth region 809 of the area. According to the GUI 800, the first audio capture device 810 may be located in the fifth region 805, the second audio capture device 820 may be located in the first region 801, and the third audio capture device 830 may be located in the ninth region 809. According to one implementation, the location for each audio capture device 810, 820, 830 may be obtained using an indoor navigation tool. The distance ($D_1$) between the first audio capture device 810 and the second audio capture device 820 may be determined using the indoor navigation tool, and the distance ($D_2$) between the first audio capture device 810 and the third audio capture device 830 may also be determined using the indoor navigation tool. Additionally, the distances ($D_1$, $D_2$) may be illustrated using a grid (not shown) having a three-dimensional effect. As a non-limiting example, if the second audio capture device 820 is farther away from the first audio capture device 810 than the third audio capture device 830, the second audio capture device 820 may appear "smaller" than the third audio capture device 830. According to another implementation, the location of each audio capture device 810, 820, 830 may be manually inputted by a user of the GUI 800.

The first audio capture device 810 may be configured to receive audio data from the second audio capture device 820 and audio data from the third audio capture device 830. For example, the second audio capture device 820 may transmit the second audio signal 822 to the first audio capture device 810, and the third audio capture device 830 may transmit the third audio signal 832 to the first audio capture device 810. The first audio capture device 810 may include a receiver configured to receive the audio data from the second audio capture device 820 and the audio data from the third audio capture device 830. The second and third audio capture devices 820, 830 may be a mobile phone, a tablet, a personal digital assistant (PDA), a laptop computer, a computer, a display device, a gaming console, a music player, a radio, a digital video player, a digital video disc (DVD) player, a tuner, a camera, a navigation device, a set-top box, a television, a laundry machine, etc.

The first audio capture device 810 may receive a user input indicating one or more selected regions 801-809 of the GUI 800. As a non-limiting example, the user input may indicate that the first region 801 (e.g., the region including the second audio capture device 820) has been selected. The first audio device 810 may include an interface configured to receive the input. Based on the user input, the first audio capture device 810 may generate audio output based on audio data from the second audio capture device 820. For example, the first audio capture device 810 may generate audio output corresponding to the second audio signal 822 if the user input indicates the first region 801 is selected. The first audio capture device 810 may include a speaker configured to project the audio output corresponding to the second audio signal 822. In the indicated example, audio output based on audio data from the other regions 802-809 (e.g., the unselected regions) may be suppressed at the first audio capture device 810. The first audio capture device 810 may use the audio suppression techniques described with respect to FIG. 1 to suppress the audio output from the other regions 802-809. According to some implementations, the suppression may be scaled from complete suppression (having an indicator of zero) to no suppression (having an indicator of one-hundred). According to other implementations, the suppression may be binary. For example, the audio output from the other regions 802-809 may be suppressed or not suppressed.

According to other implementations, audio data captured from multiple audio capture devices may be generated at the first audio capture device 810 based on the user input. For example, the user input may indicate the first region 801, the fifth region 805, and the ninth region 809 have been selected. Based on the user input, the first audio capture device 810 may generate audio output based on audio data from the second audio capture device 820, the first audio capture device 810, and the third audio capture device 830, respectively. For example, the first audio capture device 810 may generate audio output corresponding to the second audio signal 822, the first audio signal 810, and the third audio signal 832 if the user input indicates that the first, fifth, and ninth regions 801, 805, 809, respectively, are selected. An audio output from multiple capture devices 810, 820, 830 may be mixed as a single channel output or may be encoded as an output in the form of multiple channels, such as a multiple channel output. In addition to selecting audio to be output by the first audio capture device 810, the GUI 800 may enable a user to apply audio effects, filtering, specific processing, or other options to audio capture devices in selected regions.

The GUI 800 may enable a user of the first audio capture device 810 to selectively output audio captured from different regions 801-809 of the area. For example, the GUI 800 may enable the user device to suppress audio from certain regions of the area and to output audio from other regions of the area.

Figure 9:
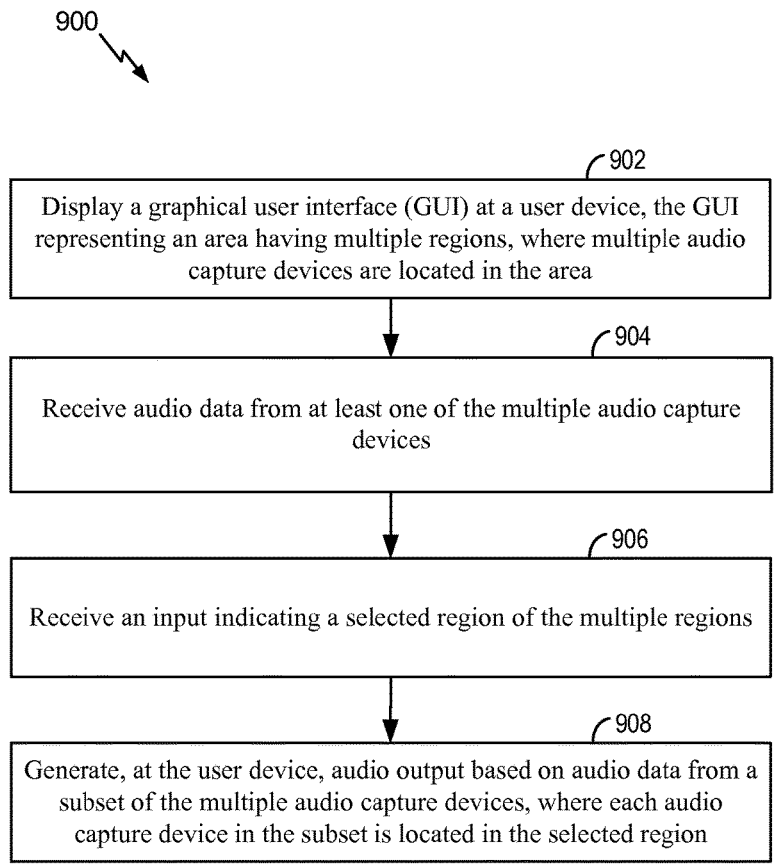
FIG. 9 is a method for generating audio output based on one or more selected regions of an area.

Referring to FIG. 9, a method 900 for generating audio output based on one or more selected regions of an area is shown. The method 900 may be performed using the first device 110 of FIG. 1, the first user device 510 of FIG. 5, the second user device 520 of FIG. 5, the first audio capture device 810 of FIG. 8, the second audio capture device 820 of FIG. 8, or the third audio capture device 830 of FIG. 8.

The method 900 includes displaying a GUI at a user device, at 902. The GUI may represent an area having multiple regions and multiple audio capture devices may be located in the area. For example, referring to FIG. 8, the first audio capture device 810 (e.g., the user device according to the method 900) may display the GUI 800. The GUI 800 may represent an area having multiple regions 801-809. Multiple audio capture devices may be located in the area. For example, the second audio capture device 820 may be located in the first region 801 of the area, the first audio capture device 810 may be located in the fifth region 805, and the third audio capture device 830 may be located in the ninth region 809.

Audio data from at least one of the multiple audio capture devices may be received, at 904. For example, referring to FIG. 8, The second audio capture device 820 may transmit the second audio signal 822 to the first audio capture device 810, and the third audio capture device 830 may transmit the third audio signal 832 to the first audio capture device 810. The first audio capture device 810 may receive audio data (e.g., the second audio signal 822) from the second audio capture device 820 and audio data (e.g., the third audio signal 832) from the third audio capture device 830. Additionally, the first audio capture device 810 may capture the first audio signal 812.

An input indicating a selected region of the multiple regions may be received, at 906. For example, referring to FIG. 8, the first audio capture device 810 may receive a user input indicating one or more selected regions 801-809 of the GUI 800. As a non-limiting example, the user input may indicate that the first region 801 (e.g., the region including the second audio capture device 820) has been selected.

An audio output may be generated based on audio data from a subset of the multiple audio capture devices, at 908. Each audio capture device in the subset may be located in the selected region. For example, referring to FIG. 8, based on the user input, the first audio capture device 810 may generate audio output based on audio data from the second audio capture device 820. For example, the first audio capture device 810 may generate audio output corresponding to the second audio signal 822 if the user input indicates the first region 801 is selected. Generating the audio output may include storing the audio corresponding to the second audio signal 822 at the first audio capture device 810, storing the audio corresponding to the second audio signal 822 at another device, rendering the audio corresponding to the second audio signal 822 at the first audio capture device 810, generating a representation of the second audio signal 822 at the first audio capture device 810, etc. In the indicated example, audio output based on audio data from the other regions 802-809 (e.g., the unselected regions) may be suppressed at the first audio capture device 810. For example, the method 900 may include reducing audio levels of audio from the other regions 802-809. The first audio capture device 810 may use the audio suppression techniques described with respect to FIG. 1 to suppress the audio output from the other regions 802-809. The method 900 may also include displaying a location of each audio captured device at the GUI.

The method 900 may also include generating an image of the area at the GUI and depicting the multiple regions within the image at the GUI. The regions 801-809 of FIG. 1 may be defined based on the area, based on the content of the area (e.g., a size of the area, a number of audio capture devices in the area, complexity of the image, etc.), based on user preferences, or a combination thereof.

The method 900 of FIG. 9 may enable a user of the user device (e.g., the first audio capture device 810) to selectively output audio captured from different regions 801-809 of the area using the GUI 800. For example, the method 900 may enable the user device to suppress audio from certain regions of the area and to output audio from other regions of the area.

Figure 10:
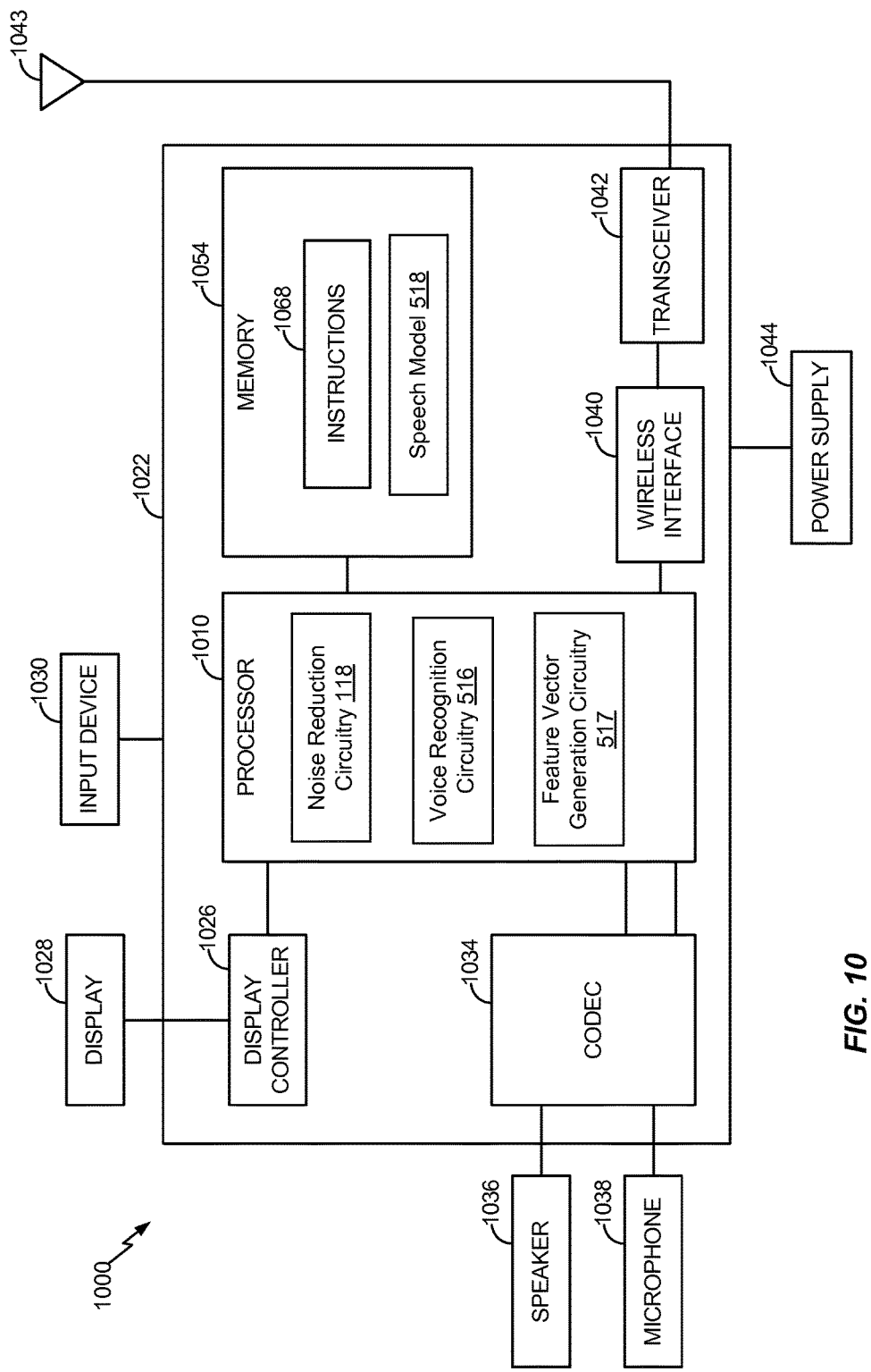
FIG. 10 is a diagram of a user device that is operable to support various aspects of one or more methods, systems, apparatuses, and/or computer-readable media disclosed herein.

Referring to FIG. 10, a user device 1000 is shown. The user device 1000 includes a processor 1010, such as a digital signal processor, coupled to a memory 1054. The processor 1010 includes the noise reduction circuitry 118 of FIG. 1, the speaker verification circuitry 516 of FIG. 5, and the feature vector generation circuitry 517 of FIG. 5. The memory 1054 includes the speech model 518 of FIG. 5.

The processor 1010 may be configured to execute software (e.g., a program of one or more instructions 1068) stored in the memory 1054. The processor 1010 may be configured to operate in accordance with the method 400 of FIG. 4, the method 600 of FIG. 6, and/or the method 900 of FIG. 9. For example, the processor 1010 may perform the noise suppression techniques described with respect to FIGS. 1-4, the voice recognition techniques described with respect to FIGS. 5-7, and/or the techniques described with respect to FIGS. 8-9.

A wireless interface 1040 may be coupled to the processor 1010 and to an antenna 1043. For example, the wireless interface 1040 may be coupled to the antenna 1043 via a transceiver 1042, such that wireless data received via the antenna 1043 may be provided to the processor 1010.

A coder/decoder (CODEC) 1034 can also be coupled to the processor 1010. A speaker 1036 and a microphone 1038 can be coupled to the CODEC 1034. A display controller 1026 can be coupled to the processor 1010 and to a display device 1028. According to one implementation, the display device 1028 may display the GUI 800 of FIG. 8. In a particular implementation, the processor 1010, the display controller 1026, the memory 1054, the CODEC 1034, and the wireless interface 1040 are included in a system-in-package or system-on-chip device 1022. In a particular implementation, an input device 1030 and a power supply 1044 are coupled to the system-on-chip device 1022. Moreover, in a particular implementation, as illustrated in FIG. 10, the display device 1028, the input device 1030, the speaker 1036, the microphone 1038, the antenna 1043, and the power supply 1044 are external to the system-on-chip device 1022. However, each of the display device 1028, the input device 1030, the speaker 1036, the microphone 1038, the antenna 1043, and the power supply 1044 can be coupled to one or more components of the system-on-chip device 1022, such as one or more interfaces or controllers.

In conjunction with the described implementations, a first apparatus includes means for capturing a first audio signal. For example, the means for capturing the first audio signal may include the microphone 114 of FIG. 1, the microphone 513 of FIG. 5, the microphone 523 of FIG. 5, the microphone 1038 of FIG. 10, one or more other devices, circuits, modules, instructions, or any combination thereof.

The first apparatus may also include means for receiving a second audio signal from a second device. The second audio signal may be captured by a microphone of the second device. For example, the means for receiving the second audio signal may include the transceiver 112 of FIG. 1, the transceiver 512 of FIG. 5, the transceiver 522 of FIG. 5, the transceiver 1042 of FIG. 10, one or more other devices, circuits, modules, instructions, or any combination thereof.

The first apparatus may also include means for performing noise reduction on the first audio signal based at least in part on the second audio signal. For example, the means for performing noise reduction may include the processor 116 of FIG. 1, the noise reduction circuitry 118 of FIGS. 1, 2, and 7, the system 300 of FIG. 3, the processor 1010 of FIG. 10, one or more other devices, circuits, modules, instructions, or any combination thereof.

In conjunction with the described implementations, a second apparatus includes means for receiving audio data at a first user device from a second user device, the audio data based on an audio signal captured at a microphone of the second user device. For example, the means for receiving audio data may include the transceiver 512 of FIG. 5, the transceiver 1042 of FIG. 10, one or more other devices, circuits, modules, instructions, or any combination thereof.

The second apparatus may also include means for performing a voice recognition function based on the audio data to determine a likelihood value indicating a likelihood that a voice represented by the audio data matches a particular voice. For example, the means for performing the voice recognition function may include the speaker verification circuitry 516 of FIGS. 5 and 10, the processor 1010 of FIG. 10, one or more other devices, circuits, modules, instructions, or any combination thereof.

The second apparatus may also include means for enabling one or more functions of the first user device in response to the likelihood value exceeding a threshold. For example, the means for enabling the one or more functions may include processor 514 of FIG. 5, the processor 1010 of FIG. 10, one or more other devices, circuits, modules, instructions, or any combination thereof.

In conjunction with the described implementations, a third apparatus includes means for displaying a graphical user interface (GUI) at a user device. The GUI may represent an area having multiple regions and multiple audio capture devices may be located in the area. For example, the means for displaying the GUI may include the processor 116 of FIG. 1, the processor 514 of FIG. 5, the processor 524 of FIG. 5, a processor of the first audio capture device 810 of FIG. 8, a processor of the second audio capture device 820 of FIG. 8, a processor of the third audio capture device 830 of FIG. 8, the processor 1010 of FIG. 10, one or more other devices, circuits, modules, instructions, or any combination thereof.

The third apparatus may also include means for receiving audio data from the multiple audio capture devices. For example, the means for receiving the audio data may include the transceiver 112 of FIG. 1, the transceiver 512 of FIG. 5, the transceiver 522 of FIG. 5, a transceiver of the first audio capture device 810 of FIG. 8, a transceiver of the second audio capture device 820 of FIG. 8, a transceiver of the third audio capture device 830 of FIG. 8, the transceiver 1042 of FIG. 10, one or more other devices, circuits, modules, instructions, or any combination thereof.

The third apparatus may also include means for receiving an input indicating a selected region of the multiple regions. For example, the means for receiving the input may include the processor 116 of FIG. 1, the processor 514 of FIG. 5, the processor 524 of FIG. 5, a processor of the first audio capture device 810 of FIG. 8, a processor of the second audio capture device 820 of FIG. 8, a processor of the third audio capture device 830 of FIG. 8, the processor 1010 of FIG. 10, one or more other devices, circuits, modules, instructions, or any combination thereof.

The third apparatus may also include means for generating audio output based on audio data from a subset of the multiple audio capture devices. Each audio capture device in the subset may be located in the selected region. For example, the means for generating the audio output may include the processor 116 of FIG. 1, the processor 514 of FIG. 5, the processor 524 of FIG. 5, a processor of the first audio capture device 810 of FIG. 8, a processor of the second audio capture device 820 of FIG. 8, a processor of the third audio capture device 830 of FIG. 8, the processor 1010 of FIG. 10, one or more other devices, circuits, modules, instructions, or any combination thereof.

Those of skill in the art would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method of generating audio output, the method comprising:
    displaying a graphical user interface (GUI) at a device, the GUI representing multiple regions of a physical space, wherein a first audio capture device is located in a first region of the multiple regions and a second audio capture device is located in a second region of the multiple regions;
    receiving, by the device, first audio data from the first audio capture device and second audio data from the second audio capture device, the first audio data representing a first audio signal having a first audio level and the second audio data representing a second audio signal having a second audio level;
    receiving, by the device, an input indicating a selection of the first region; and
    in response to receiving the input indicating the selection of the first region, generating, at the device, audio output based on the first audio signal and a reduced audio level version of the second audio signal.

2. The method of claim 1, wherein the device includes a third audio capture device located in a third region of the multiple regions, the method further comprising generating third audio data, at the device, based on a third audio signal having a third audio level, and wherein in response to the input indicating the selection of the first region, the audio output is generated based further on a reduced audio level version of the third audio signal.

3. The method of claim 1, wherein receiving the first audio data and the second audio data comprises:
    wirelessly receiving the first audio data from the first audio capture device, wherein the first audio signal is captured at the first audio capture device; and
    wirelessly receiving the second audio data from the second audio capture device, wherein the second audio signal is captured at the second audio capture device.

4. The method of claim 3, wherein generating the audio output comprises generating a representation of the first audio signal at the device.

5. The method of claim 3, wherein the reduced audio level version of the second audio signal corresponds to a suppressed representation of the second audio signal at the device.

6. The method of claim 1, further comprising determining a first location of the first audio capture device and a second location of the second audio capture device based on location data from an indoor navigation tool.

7. The method of claim 1, wherein the second audio level corresponds to an energy level of the second audio signal, and wherein the reduced audio level version of the second audio signal is generated using a max-pooling algorithm.

8. The method of claim 1, wherein the audio output comprises a single channel output or a multiple channel output.

9. The method of claim 1, further comprising displaying an indication of a first location of the first audio capture device and an indication of a second location of the second audio capture device via the GUI.

10. The method of claim 1, further comprising:
    displaying an image associated with the physical space via the GUI; and
    depicting a representation of the multiple regions within the image via the GUI.

11. An apparatus comprising:
    a processor; and
    a memory storing instructions executable to cause the processor to:
        display a graphical user interface (GUI) at a device, the GUI representing multiple regions of a physical space, wherein a first audio capture device is located in a first region of the multiple regions and a second audio capture device is located in a second region of the multiple regions;
        receive first audio data from the first audio capture device and second audio data from the second audio capture device, the first audio data representing a first audio signal having a first audio level and the second audio data representing a second audio signal having a second audio level;
        receive an input indicating a selection of the first region; and in response to receiving the input indicating the selection of the first region, generate, at the device, audio output based on the first audio signal and a reduced audio level version of the second audio signal.

12. The apparatus of claim 11, wherein the physical space includes a room, a portion of a building, an outdoor space, or a combination thereof.

13. The apparatus of claim 11, wherein the first region corresponds to a first three dimensional region within the physical space and the second region corresponds to a second three dimensional region within the physical space.

14. The apparatus of claim 13, wherein the input further indicates a third region of the multiple regions.

15. The apparatus of claim 14, wherein the instructions are further executable to cause the processor to, in response to the input indicating the third region, generate the audio output based further on third audio data received from a third audio capture device within the third region, the third audio data representing a third audio signal.

16. The apparatus of claim 11, wherein the instructions are further executable by the processor to determine a value of an indicator and generate the reduced audio level version of the second signal based on the indicator.

17. The apparatus of claim 11, wherein a first location of the first audio capture device and a second location of the second audio capture device are determined based on a user input.

18. The apparatus of claim 11, wherein the audio output comprises a single channel output or a multiple channel output.

19. The apparatus of claim 11, further comprising the first audio capture device, wherein the first audio capture device includes a microphone configured to generate the first audio data based on the first audio signal as the first audio signal is transmitted through the first region.

20. The apparatus of claim 11, further comprising:
a receiver configured to receive the first audio data and the second audio data;
an interface configured to receive the input; and
a speaker configured to project the audio output.

21. A non-transitory computer-readable medium comprising instructions for generating audio output, the instructions, when executed by a processor, cause the processor to perform operations comprising:
displaying a graphical user interface (GUI) at a device, the GUI representing multiple regions of a physical space, a first audio capture device is located in a first region of the multiple regions and a second audio capture device is located in a second region of the multiple regions;
receiving first audio data from the first audio capture device and second audio data from the second audio capture device, the first audio data representing a first audio signal having a first audio level and the second audio data representing a second audio signal having a second audio level;
receiving an input indicating a selection of the first region; and
in response to receiving the input indicating the selection of the first region, generating, at the device, audio output based on the first audio signal and a reduced audio level version of the second signal.

22. The non-transitory computer-readable medium of claim 21, wherein the operations further comprise generating the reduced audio level version of the second audio signal using a max-pooling technique.

23. The non-transitory computer-readable medium of claim 21, wherein receiving the first audio data and the second audio data comprises:
wirelessly receiving the first audio data from the first audio capture device, wherein the first audio data represents the first audio signal captured at the first audio capture device; and
wirelessly receiving the second audio data from the second audio capture device, wherein the second audio data represents the second audio signal captured at the second audio capture device.

24. The non-transitory computer-readable medium of claim 23, wherein generating the audio output comprises generating a representation of the first audio signal at the device.

25. The non-transitory computer-readable medium of claim 23, wherein generating the audio output comprises:
generating an estimate of the second audio level; and
generating the reduced audio level version of the second audio signal at the device based on the estimate, and wherein the reduced audio level version of the second audio signal has a third audio level that is less than the second audio level.

26. The non-transitory computer-readable medium of claim 21, wherein the operations further include determining a first location of the first audio capture device and a second location of the second audio capture device based on location data received from an indoor navigation tool.

27. The non-transitory computer-readable medium of claim 21, wherein the operations further include determining a first location of the first audio capture device and a second location of the second audio capture device based on a user input.

28. An apparatus comprising:
means for displaying a graphical user interface (GUI) at a device, the GUI representing multiple regions of a physical space, wherein a first audio capture device is located in a first region of the multiple regions and a second audio capture device is located in a second region of the multiple regions;
means for receiving first audio data from of the the first audio capture device and second audio data from the second audio capture device, the first audio data representing a first audio signal having a first audio level and the second audio data representing a second audio signal having a second audio level;
means for receiving an input indicating a selection of the first region; and
means for generating, in response to the input indicating the selection of the first region, audio output at the device based on data the first audio signal and a reduced audio level version of the second audio signal.

29. The apparatus of claim 28, wherein the audio output comprises a single channel output or a multiple channel output.

30. The apparatus of claim 28, wherein the GUI indicates a location of the first audio capture device.

* * * * *